US009935959B2

(12) United States Patent
Keith et al.

(10) Patent No.: US 9,935,959 B2
(45) Date of Patent: Apr. 3, 2018

(54) CLOUD SERVICE CUSTOM EXECUTION ENVIRONMENT

(71) Applicant: Oracle International Corporation, Redwood Shores, CA (US)

(72) Inventors: Michael Keith, Ottawa (CA); William Bruce Kilgore, Tempe, AZ (US); Kaj van de Loo, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 100 days.

(21) Appl. No.: 14/489,172

(22) Filed: Sep. 17, 2014

(65) Prior Publication Data
US 2015/0229645 A1 Aug. 13, 2015

Related U.S. Application Data

(60) Provisional application No. 61/986,363, filed on Apr. 30, 2014, provisional application No. 61/937,316, filed on Feb. 7, 2014.

(51) Int. Cl.
*H04L 29/06* (2006.01)
*G06F 21/53* (2013.01)
(Continued)

(52) U.S. Cl.
CPC ............. *H04L 63/10* (2013.01); *G06F 9/468* (2013.01); *G06F 21/53* (2013.01); *H04L 41/50* (2013.01);
(Continued)

(58) Field of Classification Search
CPC . H04L 63/10; H04L 41/50; H04L 4/15; G06F 9/468; G06F 9/455; G06F 21/53; G06F 2009/45587; H04W 12/08
See application file for complete search history.

(56) References Cited

U.S. PATENT DOCUMENTS 6,560,656 B1 * 5/2003 O'Sullivan ........... G06F 9/4416
709/220
6,751,671 B1 6/2004 Urien
(Continued)

FOREIGN PATENT DOCUMENTS

CA 1271827 7/1990
EP 1569112 A2 8/2005
(Continued)

OTHER PUBLICATIONS

Chung—"User Defined Privilege Restriction Mechanism for Secure Execution Environments on Android," 2014, pp. 815-816.*
(Continued)

*Primary Examiner* — Luu Pham
*Assistant Examiner* — James J Wilcox
(74) *Attorney, Agent, or Firm* — Kilpatrick Townsend & Stockton LLP

(57) ABSTRACT

Techniques are described for implementing a cloud computer system to provide access to a custom execution environment for execution of custom executable instructions. Users may be able to configure one or more different types of template execution environments, e.g., a virtual machine environment, each of which can be used to establish a type of custom execution environment. Users may configure the template execution environment with regard to settings, states, resources, permissions, or other criterion related to an execution environment. Upon request, a custom execution environment (e.g., a child execution environment) may be established for running one instance of a custom executable instruction. The custom execution environment may be based on the template execution environment. The custom execution environment may provide a secure, isolated environment for execution of a custom executable instruction. Access permissions for the custom execution (Continued)

environment may be configurable depending on a type of execution environment desired.

6 Claims, 9 Drawing Sheets

(51) Int. Cl.
*G06F 9/46* (2006.01)
*H04L 12/24* (2006.01)
*G06F 9/455* (2018.01)
*H04W 12/08* (2009.01)

(52) U.S. Cl.
CPC .... *G06F 9/455* (2013.01); *G06F 2009/45587* (2013.01); *H04W 12/08* (2013.01)

(56) References Cited

U.S. PATENT DOCUMENTS

| | | | |
|---|---|---|---|
| 6,970,935 B1 | 11/2005 | Maes | |
| 7,430,290 B2 | 9/2008 | Zhu | |
| 8,504,837 B2 | 8/2013 | Jasper et al. | |
| 9,043,600 B2 | 5/2015 | Jasper et al. | |
| 9,116,767 B1* | 8/2015 | Arif | G06F 8/60 |
| 9,201,850 B1 | 12/2015 | Buddhiraja | |
| 9,276,942 B2* | 3/2016 | Srinivasan | G06Q 10/06315 |
| 9,354,906 B1 | 5/2016 | Uchronski et al. | |
| 9,438,599 B1* | 9/2016 | Yuhan | H04L 63/10 |
| 9,692,717 B2* | 6/2017 | Mares | H04L 51/04 |
| 9,703,855 B1* | 7/2017 | Smalley | G06F 21/6218 |
| 9,712,535 B1* | 7/2017 | Rossman | H04L 63/10 |
| 9,779,070 B2* | 10/2017 | Thakare | G06F 17/2252 |
| 9,807,041 B2* | 10/2017 | Mordani | H04L 51/04 |
| 9,847,905 B2* | 12/2017 | Perez | H04L 41/0806 |
| 9,860,309 B2* | 1/2018 | Doctor | H04L 67/10 |
| 2003/0093672 A1* | 5/2003 | Cichowlas | G06F 9/468 713/168 |
| 2003/0187631 A1 | 10/2003 | Masushige et al. | |
| 2004/0107196 A1 | 6/2004 | Chen et al. | |
| 2004/0162823 A1 | 8/2004 | van de Loo et al. | |
| 2004/0177342 A1* | 9/2004 | Worley, Jr. | G06F 9/468 717/121 |
| 2006/0112127 A1 | 5/2006 | Krause et al. | |
| 2006/0206348 A1 | 9/2006 | Chen et al. | |
| 2007/0180450 A1* | 8/2007 | Croft | G06F 3/1415 718/1 |
| 2007/0192329 A1* | 8/2007 | Croft | G06F 3/1415 |
| 2007/0240136 A1* | 10/2007 | Garyali | G06F 9/468 717/140 |
| 2008/0010676 A1 | 1/2008 | Dosa Racz et al. | |
| 2009/0158302 A1 | 6/2009 | Nicodemus et al. | |
| 2009/0170557 A1 | 7/2009 | Chauhan et al. | |
| 2010/0031325 A1* | 2/2010 | Maigne | G06F 9/45533 726/4 |
| 2011/0307547 A1 | 12/2011 | Backer et al. | |
| 2012/0102539 A1* | 4/2012 | Robb | G06F 21/6218 726/1 |
| 2012/0109902 A1 | 5/2012 | Rozensztejn et al. | |
| 2012/0155470 A1 | 6/2012 | McNamee et al. | |
| 2012/0158872 A1 | 6/2012 | McNamee et al. | |
| 2012/0158993 A1 | 6/2012 | McNamee et al. | |
| 2012/0158994 A1 | 6/2012 | McNamee et al. | |
| 2012/0158995 A1 | 6/2012 | McNamee et al. | |
| 2012/0176968 A1 | 7/2012 | Luna | |
| 2013/0055256 A1* | 2/2013 | Banga | G06F 21/53 718/1 |
| 2013/0086210 A1 | 4/2013 | Yiu et al. | |
| 2013/0086211 A1 | 4/2013 | Sondhi et al. | |
| 2013/0110778 A1 | 5/2013 | Taylor et al. | |
| 2013/0111558 A1* | 5/2013 | Sangubhatla | G06F 21/44 726/4 |
| 2013/0174154 A1 | 7/2013 | Poore et al. | |
| 2013/0219176 A1* | 8/2013 | Akella | H04L 63/0815 713/165 |
| 2013/0275492 A1 | 10/2013 | Kaufman et al. | |
| 2014/0025832 A1 | 1/2014 | Ito | |
| 2014/0075565 A1* | 3/2014 | Srinivasan | G06Q 10/06315 726/26 |
| 2014/0173694 A1* | 6/2014 | Kranz | G06F 21/606 726/4 |
| 2014/0181864 A1 | 6/2014 | Marshall et al. | |
| 2014/0317617 A1* | 10/2014 | O'Donnell | G06F 9/45533 718/1 |
| 2014/0317701 A1* | 10/2014 | Eicken | H04L 67/1097 726/5 |
| 2015/0007263 A1* | 1/2015 | Stewart | H04L 63/08 726/3 |
| 2015/0082385 A1 | 3/2015 | Maria | |
| 2015/0130365 A1 | 5/2015 | Kim et al. | |
| 2015/0172367 A1* | 6/2015 | Said | H04L 67/306 709/204 |
| 2015/0178107 A1 | 6/2015 | Gummaraju et al. | |
| 2015/0178110 A1 | 6/2015 | Li et al. | |
| 2015/0178359 A1* | 6/2015 | Grasselt | H04L 47/72 707/602 |
| 2015/0227405 A1 | 8/2015 | Jan et al. | |
| 2015/0227406 A1 | 8/2015 | Jan et al. | |
| 2015/0229638 A1 | 8/2015 | Loo | |
| 2015/0278245 A1 | 10/2015 | Sagar et al. | |
| 2016/0105321 A1* | 4/2016 | Thakkar | H04L 41/0853 709/220 |
| 2016/0132351 A1 | 5/2016 | Kashyap et al. | |
| 2016/0182336 A1* | 6/2016 | Doctor | H04L 43/062 709/224 |
| 2016/0261564 A1* | 9/2016 | Foxhoven | H04L 63/0272 |
| 2016/0328522 A1* | 11/2016 | Howley | G06F 19/322 |
| 2016/0328577 A1* | 11/2016 | Howley | G06F 19/322 |
| 2016/0335118 A1* | 11/2016 | Beiter | G06F 9/468 |
| 2016/0337356 A1* | 11/2016 | Simon | H04L 63/10 |
| 2017/0006032 A1* | 1/2017 | Simpson | H04L 63/10 |
| 2017/0034012 A1* | 2/2017 | Douglas | H04L 41/50 |
| 2017/0132042 A1* | 5/2017 | Cherkasova | G06F 9/505 |
| 2017/0201549 A1* | 7/2017 | Vincent | H04L 63/20 |
| 2017/0293479 A1* | 10/2017 | Kumar | G06F 8/65 |
| 2017/0331791 A1* | 11/2017 | Wardell | H04L 63/0281 |
| 2018/0013763 A1* | 1/2018 | Wilson | H04L 63/101 |

FOREIGN PATENT DOCUMENTS

| | | |
|---|---|---|
| EP | 2849061 | 3/2015 |
| WO | 2013/071087 A1 | 5/2013 |
| WO | 2013086211 | 6/2013 |
| WO | 2013126570 | 8/2013 |
| WO | 2015038225 | 3/2015 |
| WO | 2015042547 | 3/2015 |
| WO | 2015050568 | 4/2015 |
| WO | 2015119529 | 8/2015 |
| WO | 2015119658 | 8/2015 |
| WO | 2015119659 | 8/2015 |

OTHER PUBLICATIONS

Wang—"Rethink the Virtual Machine Template," Mar. 11, 2011, pp. 39-49.*
Ekberg—"Trusted Execution Environments on Mobile Devices," Nov. 8, 2013, pp. 1497-1498.*
International Search Report and Written Opinion dated Dec. 5, 2014 for Int'l Patent Application No. PCT/US2014/056154, 12 pages.
Chanliau, Marc, "Securing SOA and Web Services with Oracle Enterprise Gateway", http://www.oracle.com/, Apr. 30, 2011 [retrieved on Nov. 10, 2014]. Retrieved from the Internet: <URL:http://www.oracle.com/technetwork/middleware/id-mgmt/oeg-tech-wp-apr-2011-345875.pdf>, 22 pages.
International Search Report and Written Opinion dated Nov. 25, 2014 for Int'l Patent Application No. PCT/US2014/053747, 17 pages.
Booking and Paying for Your Holiday—Holidays FAQs, et2holidays.com, Copyright Jet2holidays.com, 2002-2014, a subsidiary of Dart Group PLC, Retrieved from the Internet: <URL: http://www.jet2holidays.com/faqs-essential-info2.aspx>, 2002-2014, 2 pages.

(56) References Cited

OTHER PUBLICATIONS

Disney FastPass+, AllEars.Net, R.Y.I. Copyright Enterprises, LLC, Retrieved from the Internet: <URL: http://allears.net/tp/fastpass-plus.htm>, 1999-2014, 4 pages.

Dispersed Virtual Queue Management, tensabarrieronline.com, Tensabarrieronline—Tamis Corporation, Retrieved from the Internet: <URL: http://www.tensabarrieronline.com/shop/dispersed-virtual-queue-management!>, Copyright 2014, 2 pages.

Electronic Queuing—QtracVR Virtual Queuing System, lavi.com, Lavi Industries, Retrieved from the Internet: <URL: http://www.lavi.com/electronic-queuing/virtual-queuing.aspx>, Copyright 2014, 2 pages.

Electronic Ticket System—Queue Management without Lines, queuesolutions.com, Copyright 2013 Queue Solutions, Inc., Retrieved from the Internet: <URL: http://queuesolutions.com/electronic-ticketsystem.php>, 2012, 2 pages.

eQTM Virtual Queuing, tensator.com, Copyright Tensator, Retrieved from the Internet: <URL: http://www.tensator.com/us/showroom/eq-virtual-queuing.aspx>, 1 page.

NEMO-Q Virtual Queuing, NEMO-Q.com, retrieved from the Internet: <URL: http://www.nemoq.com/virtual_queuing_systems.html>, Copyright 2014, 3 pages.

Queuing at busy check-in counters is now a thing of the past, thanks to our online "self check-in" system, airnamibia.com, Air Namibia, Retrieved from the Internet: <URL: http://www.airnamibia.com/planbook/check-in-online/>, 2 pages.

VirtuaQ: Virtual Queue Management System, esco.com.sg, Copyright 2012, Esco Pte. Ltd., <URL: http://www.esco.com.sg/development-and-mobility/virtuaq/>, 2012, 3 pages.

Web Check-in—Bangkok Airways, bangkokair.com, Bangkok Airways, Retrieved from the Internet: <URL: http://www.bangkokair.com/pages/view/web-check-in>, 2 pages.

Facemire et al., Cloud Mobile Development: Enabled by Back-End-As-A-Service, Mobile's New Middleware, Aug. 30, 2012, 15 pages.

Keating, Cloud-based setup reduces wait-times at government offices (with related video), American City & County, Retrieved from the Internet: <URL: http://americancityandcounty.com/telecommunications/cloud-based-setup-reduces-wait-timesgovernment-offices-related-video>, May 5, 2014, 4 pages.

Lawson, House of Fraser trials virtual queue system for online collection, Retail Week [online]. EMAP Publishing Limited, Retrieved from the Internet: <URL: http://www.retailweek.com/companies/house-of-fraser/house-of-fraser-trials-virtual-queue-systemfor-online-collection/5052769.article>, Sep. 6, 2013, 3 pages.

International Application No. PCT/RU2014/000677, International Search Report and Written Opinion dated Feb. 19, 2015, 13 pages.

International Application No. PCT/US2014/044165, International Search Report and Written Opinion dated Nov. 11, 2014, 9 pages.

U.S. Appl. No. 14/475,285, Notice of Allowance dated Aug. 24, 2015, 17 pages.

Ponge, Julien, "Scenarios for using Oracle Nashorn as a command-line tool and as an embedded interpreter in Java applications," Oracle Technology Network [online], [retrieved on Sep. 15, 2014], retrieved from the internet: <URL: http://www.oracle.com/technetwork/articles/java/jf14-nashorn-2126515.html>, 8 pages.

Ponge, Julien, "Fork and Join: Java can excel at painless parallel programming too!," Oracle Technology Network, Jul. 2011, [online], [retrieved on Sep. 15, 2014], retrieved from the internet: <URL: http://www.oracle.com/technetwork/articles/java/fork-join-422606.html>, 7 pages.

Woods, Dan, "Oracle Unveils Project Avatar at JavaOne," InfoQ.com, Sep. 27, 2013, [online], [retrieved on Sep. 15, 2014], retrieved from the internet: <URL: http://www.infoq.com/news/2013/09/oracle-unveils-avatar>, 13 pages.

International Application No. PCT/US2014/056154, Written Opinion dated Jan. 4, 2016, 11 pages.

Singapore patent Application SG11201604890W, Search report and Written Opinion dated Aug. 17, 2017, 10 pages.

\* cited by examiner

CLOUD SERVICE CUSTOM EXECUTION ENVIRONMENT

CROSS-REFERENCES TO RELATED APPLICATIONS

The present application claims priority and benefit from the following patent applications: (1) U.S. Provisional Application No. 61/986,363, filed Apr. 30, 2014, entitled "MOBILE CLOUD SERVICE CUSTOM CODE CONTAINER;" and (2) U.S. Provisional Application No. 61/937,316, filed Feb. 7, 2014, entitled "MOBILE CLOUD SERVICE (MCS)." The entire contents of the above-identified provisional patent applications are incorporated herein by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to the field of computer infrastructure. Specifically presented are techniques for providing access to a custom execution environment for execution of custom executable instructions.

BACKGROUND

Companies are striving for ways to enable their users, such as developers and administrators, to configure and/or operate a computing environment in a secure and efficient manner. Such users may find it useful to enable a user to execute multiple instances of code in individual secure environments. One of the challenges for enabling such a system is managing the loading and the use of resources (e.g., computing resources). Users or administrators are burdened with the task of configuring environments and loading resources on multiple occasions, even for tasks that are routinely and regularly performed. Computing resources may be used inefficiently to perform configurations and load resources often. Further, a delay may be encountered to execute code and configure or operate a computing system when such an environment and/or resources are not readily configured or loaded for use. In some instances, execution of custom code may enable unpermitted or unwanted access to computing resources of other processes, which may pose a security threat for sensitive environments in the computing system. Companies may benefit from a computing system that can manage the demands of users that wish to execute code often and to configure different environments based on the type of operations or code being executed.

BRIEF SUMMARY

Techniques are described for implementing a cloud computer system to provide access to a custom execution environment for execution of custom executable instructions (e.g., custom code). A user may be able to configure one or more different types of template execution environments, e.g., a virtual machine environment, each of which can be used to establish a type of custom execution environment. A user may configure the template execution environment with regard to a setting, a state, a variable, a resource, a permission, or other criterion related to an execution environment. Upon request, a custom execution environment (e.g., a child execution environment) may be established for running an instance of a custom executable instruction. The custom execution environment may be based on (e.g., a copy of) the template execution environment. The custom execution environment may provide a secure, isolated environment for execution of a custom executable instruction. Access permissions for the custom execution environment may be configurable depending on a type of execution environment desired. A template execution environment may be configured for a particular type of language or environment that supports execution of a custom executable instruction.

According to at least one example, techniques may be provided for accessing a custom execution environment for execution of custom executable instructions. Such techniques may be implemented by a computer system (e.g., a cloud computer system). For example, the computer system may include a server computer. The computer system may implement the techniques disclosed herein. The techniques can include a computer-implemented method. The method may include executing a template execution environment. The template execution environment may be configured to establish child execution environments. Each child execution environment may be configured to execute one or more custom executable instructions. The method may include receiving a request to execute a custom executable instruction. The method may include establishing a first child execution environment to execute the requested custom executable instruction. The first child execution environment may be established based on the template execution environment. The method may include loading the requested custom executable instruction for execution in the first child execution environment and then configuring an access permission for the first child execution environment. The method may include executing the requested custom executable instruction in the first child execution environment. The requested custom executable instruction may be executed after the access permission is configured.

In certain embodiments, a template execution environment is a Java® virtual machine (JVM) environment and the first child execution environment is a child JVM environment.

In certain embodiments, establishing the first child execution environment includes executing a fork command to create the first child execution environment from the template execution environment.

In certain embodiments, a child execution environment inherits a configuration of the template execution environment.

In certain embodiments, configuring an access permission for a child execution environment includes adjusting permission for accessing the requested custom executable instruction. The permission may be adjusted to prevent the requested custom executable instruction from being accessed from within the child execution environment.

In certain embodiments, an access permission is configured through a security model for a template execution environment.

In certain embodiments, a template execution environment is configured based on at least one criterion for a tenant registered with the computer system.

In certain embodiments, the method implemented by the computer system may further include selecting a template execution environment from a plurality of template execution environments. Each template execution environment of the plurality of template execution environments may establish a child execution environment. Each template execution environment of the plurality of template execution environments may be configured to execute a different type of custom executable instruction.

In certain embodiments, the method implemented by the computer system may further include classifying a type of custom executable instruction corresponding to the requested custom executable instruction. The template execution environment may be selected based on the classified type of custom executable instruction.

In certain embodiments, the method implemented by the computer system may further include loading a resource for execution of the template execution environment. The request to execute the requested custom executable instruction may be received after loading the resource for execution of the template execution environment.

In certain embodiments, the method implemented by the computer system may further include configuring the template execution environment before executing the template execution environment. Configuring the template execution environment may include initializing settings for the template execution environment and initializing a state for the template execution environment.

In certain embodiments, the method implemented by the computer system may further include establishing, in the computer system, an additional child execution environment to execute an additional customer executable instruction. The additional child execution environment may be established based on the template execution environment. The method may further include loading the additional custom executable instruction for execution in the additional child execution environment. The method may include setting access permission for the additional child execution environment. The method may include executing the additional custom executable instruction in the additional child execution environment.

In certain embodiments, the method implemented by the computer system may further include loading the requested custom executable instruction for execution in the first child execution environment.

According to at least one example, techniques may be provided for accessing a custom execution environment for execution of custom executable instructions. Such techniques may be implemented by a computer system (e.g., a cloud computer system). The computer system may include one or more processors and one or more memory devices coupled to the one or more processors. For example, the computer system may include a server computer. The one or more memory devices may contain instructions that, when executed on the one or more processors, cause the one or more processors to implement the techniques disclosed herein. The instructions, when executed on the one or more processors, cause the one or more processors to receive a criterion for configuring a template execution environment of a plurality of template execution environments. Each template execution environment of the plurality of template execution environments may establish a child execution environment. Each template execution environment of the plurality of template execution environments may be configured to execute a different type of custom executable instruction. The instructions, when executed on the one or more processors, cause the one or more processors to receive, from a computing device using a first communication protocol, a request to execute a custom executable instruction. The instructions, when executed on the one or more processors, cause the one or more processors to classify a type of custom executable instruction corresponding to the requested custom executable instruction. The instructions, when executed on the one or more processors, cause the one or more processors to select a first template execution environment from the plurality of template execution environments. The first template execution environment may be selected based on the classified type of custom executable instruction. The instructions, when executed on the one or more processors, cause the one or more processors to execute the first template execution environment. The instructions, when executed on the one or more processors, cause the one or more processors to establish a first child execution environment to execute the requested custom executable instruction. The first child execution environment may be established based on the first template execution environment. The instructions, when executed on the one or more processors, cause the one or more processors to load the requested custom executable instruction for execution in the first child execution environment and then configure an access permission for the first child execution environment. The instructions, when executed on the one or more processors, cause the one or more processors to execute the requested custom executable instruction in the first child execution environment. The requested custom executable instruction may be executed after the access permission is configured for the first child execution environment.

According to at least one example, techniques may be provided for accessing a custom execution environment for execution of custom executable instructions. Such techniques may be implemented by a computer system (e.g., a cloud computer system). The computer system may include one or more processors and a computer-readable memory. For example, the computer system may include a server computer. The computer-readable memory may store a set of instructions that, when executed by one or more processors, causes the one or more processors to implement techniques described herein. The set of instructions, when executed by one or more processors, causes the one or more processors to execute a template execution environment. The template execution environment may be configured to establish child execution environments. Each child execution environment may be configured to execute one or more custom executable instructions. The set of instructions, when executed by one or more processors, causes the one or more processors to receive a request to execute a custom executable instruction. The set of instructions, when executed by one or more processors, causes the one or more processors to establish a first child execution environment to execute the requested custom executable instruction. The first child execution environment may be established based on the template execution environment. The set of instructions, when executed by one or more processors, causes the one or more processors to load the requested custom executable instruction for execution in the first child execution environment and then to configure an access permission for the first child execution environment. The set of instructions, when executed by one or more processors, causes the one or more processors to execute the requested custom executable instruction in the first child execution environment. The requested custom executable instruction may be executed after the access permission is configured.

According to at least one example, a computer system may be provided. The computer system may comprise: a first receiver configured to receive a criterion for configuring a template execution environment of a plurality of template execution environments, wherein each template execution environment of the plurality of template execution environments establishes a child execution environment, and wherein each template execution environment of the plurality of template execution environments is configured to execute a different type of custom executable instruction; a second receiver configured to receive, from a computing device using a first communication protocol, a request to execute a custom executable instruction; a classifying unit configured to classify a type of custom executable instruction corresponding to the requested custom executable instruction; a selecting unit configured to select a first template execution environment from the plurality of template execution environments, wherein the first template execution environment is selected based on the classified type of custom executable instruction; a first executing unit configured to execute the first template execution environment; an establishing unit configured to establish a first child execution environment to execute the requested custom executable instruction, wherein the first child execution environment is established based on the first template execution environment; a loading unit configured to load the requested custom executable instruction for execution in the first child execution environment; a configuring unit configured to configure an access permission for the first child execution environment; and a second executing unit configured to execute the requested custom executable instruction in the first child execution environment, wherein the requested custom executable instruction is executed after the access permission is configured for the first child execution environment.

In certain embodiments, the computer system may be a mobile cloud computer system, and the computing device may be a mobile computing device.

In certain embodiments, the first child execution environment inherits a configuration of the template execution environment.

In certain embodiments, the configuring unit further comprises an adjusting unit configured to adjust permission for accessing the requested custom executable instruction, wherein the permission is adjusted to prevent the requested custom executable instruction from being accessed from within the first child execution environment.

According to at least one example, an apparatus for executing custom executable instructions may be provided. The apparatus may comprise: means for executing a template execution environment, wherein the template execution environment is configured to establish child execution environments, each child execution environment configured to execute one or more custom executable instructions; means for receiving a request to execute a custom executable instruction; means for establish a first child execution environment to execute the requested custom executable instruction, wherein the first child execution environment is established based on the template execution environment; means for loading the requested custom executable instruction for execution in the first child execution environment; means for configuring an access permission for the first child execution environment; and means for executing the requested custom executable instruction in the first child execution environment, wherein the requested custom executable instruction is executed after the access permission is configured.

In certain embodiments, the first child execution environment inherits a configuration of the template execution environment.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

BRIEF DESCRIPTION OF THE DRAWINGS

Illustrative embodiments of the present invention are described in detail below with reference to the following drawing figures.

DETAILED DESCRIPTION

Figure 1:
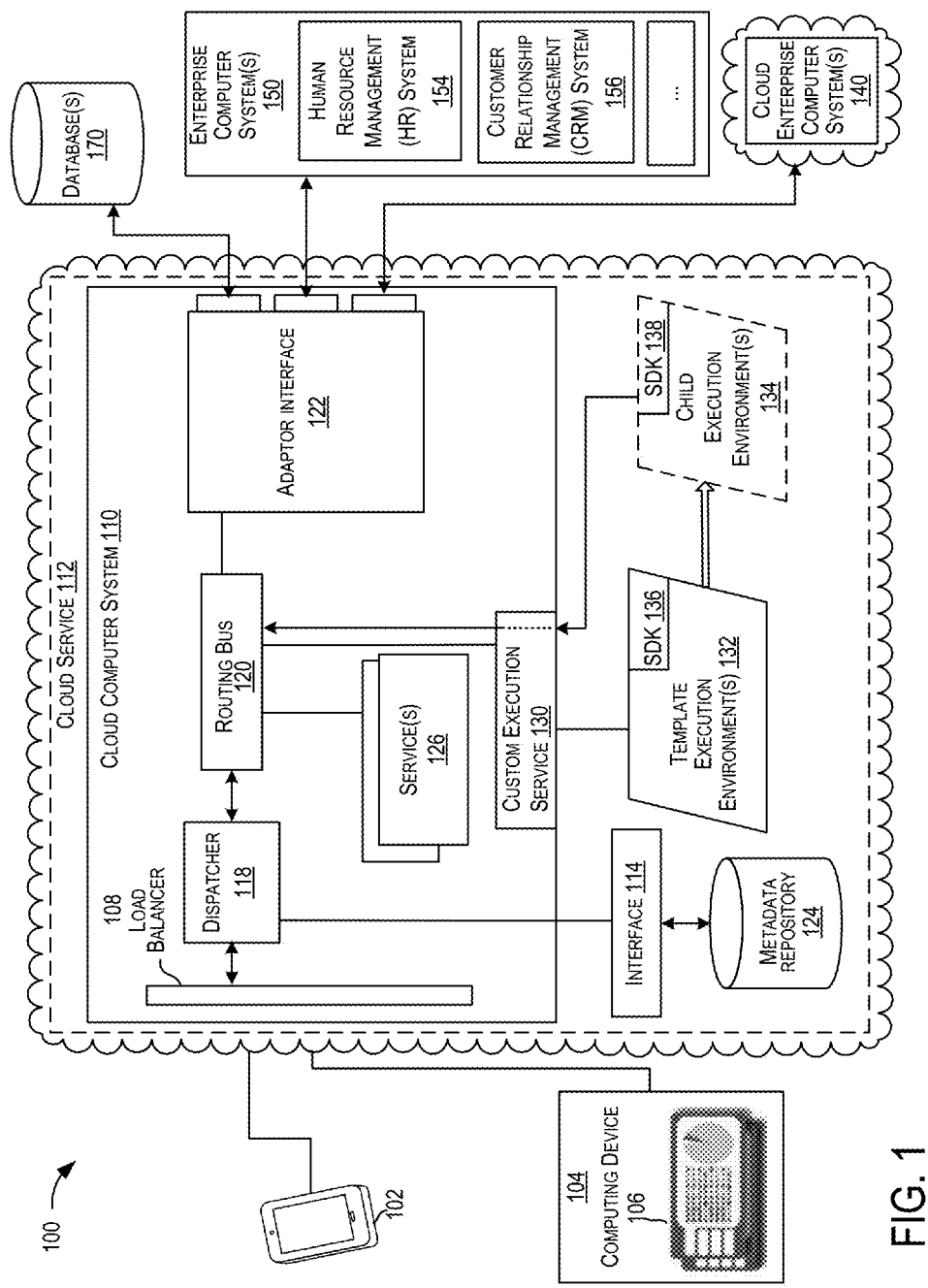
FIG. 1 shows a block diagram of a computer system to provide access to a custom execution environment for execution of custom executable instructions according to some embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computer system.

Techniques are described for implementing a cloud computer system to provide access to a custom execution environment for execution of custom executable instructions (e.g., custom code). A user may be able to configure one or more different types of template execution environments, e.g., a virtual machine environment, each of which can be used to establish a type of custom execution environment. Users may configure the template execution environment with regard to a setting, a state, a variable, a resource, a permission, or other criterion related to an execution environment. Upon request, a custom execution environment (e.g., a child execution environment) may be established for running an instance of a custom executable instruction. The custom execution environment may be based on (e.g., a copy of) the template execution environment. The custom execution environment may provide a secure, isolated environment for execution of a custom executable instruction. Access permissions for the custom execution environment may be configurable depending on a type of execution environment desired. A template execution environment may be configured for a particular type of language or environment that supports execution of a custom executable instruction.

FIG. 1 shows a block diagram of a computer system 100 to provide access to a custom execution environment for execution of custom executable instructions according to some embodiments of the present invention. For purposes of illustration, various examples are provided herein to describe techniques for enabling a computing device (e.g., computing device 102) to communicate with one or more enterprise computer systems, such as a cloud enterprise computer system 140 (e.g., "serviceprovider.com") and an on-premises enterprise computer system 150. Such communications may be to exchange or transfer enterprise data, request services provided by an enterprise computer system, communicate messages, execute one or more custom executable instructions, or combinations thereof.

Messages may include service invocation messages, result messages, request messages, other messages communicated internally, other messages communicated between a computing device and an enterprise computer system, or combinations thereof. A message may include a message type (e.g., a type value from a set of shared type constants), a correlation id (e.g., an id used to correlate this message with one or more other messages), priority information to support for priority based message queues, timeout, sensitivity indicator to support message data isolation, message source (e.g., a uniform resource identifier of a sender), a message destination (e.g., a uniform resource identifier that uniquely identifies the destination, a request context (e.g., request information from dispatcher), and/or a message payload. The payload may have different attributes depending upon the type of message that is being sent, such as parameter data and result data.

A custom executable instruction may include one or more lines of program code, binary code, an executable operation, a machine instruction, a machine code, or combinations thereof. A custom executable instruction may include information readable by a processor to cause the processor to perform an operation, a method, a routine, or the like. A custom executable instruction may be included in or may implement a software program. A custom executable instruction may be configurable by a user. A custom executable instruction may cause one or more executable instructions to be executed. A custom executable instruction may be written using a computer programming language, such as an object-oriented language (e.g., Java®), a scripting language (e.g., Groovy® or JavaScript), a machine language, a hardware programming language, a system language, an operating system language, other types of languages, or combinations thereof. A custom executable instruction may cause one or more operations to be performed in cloud computer system 110. Such operations may include transforming enterprise data from an enterprise computer system, aggregating enterprise data from an enterprise computer system, performing some amount of business logic on enterprise data, or other operations related to processing or communicating enterprise data.

Enterprise data as described herein may include data received from an enterprise computer system, data sent to an enterprise computer system, data processed by an enterprise computer system, or combinations thereof. The enterprise data may be distinguishable from data for consumer applications and/or services. In some embodiments, for example, enterprise data may change based on application or use of the enterprise data, whereas data for consumer applications (e.g., consumer data) may remain static through use. In certain embodiments, enterprise data may include or be associated with rules that indicate criteria for storing, using, and/or managing the enterprise data. For example, enterprise data may be associated with policy information that indicates one or more policies for storing, using, and/or managing the enterprise data. In certain embodiments, policy information may be included in enterprise data. In certain embodiments, enterprise data may include data processed, stored, used, or communicated by an application or a service executing in an enterprise computer system. For example, enterprise data may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computer system. Configuration or synchronization data may include data used for synchronization of enterprise data, such as versions, history, integration data, etc. Documents in enterprise data may include extended markup language (XML) files, visual assets, configuration files, media assets, etc. A BLOB may include a collection of binary data stored as a single entity in a database management system, such as an image, multimedia object, or executable code, or as otherwise known in the art.

An enterprise computer system may include various computing systems that are configured to operate for an entity or an enterprise. For example, an enterprise computer system may include one or more computer systems, such as an enterprise server computer (e.g., a back-end server computer), to handle requests for services. An enterprise computer system may include applications and/or services, which can process and/or operate using enterprise data. For example, enterprise computer system 150 may provide one or more services and/or applications for managing or operating an enterprise. Services may include, without restriction, customer relationship management (CRM), human capital management (HCM), human resource (HR) management, supply chain management, enterprise communication, email communication, business services, other enterprise management services or applications, or combinations thereof. Enterprise computer system 150 may include one or more computer systems dedicated to providing one or more services. In some embodiments, each different computer system providing a service may be located on-premise of an enterprise or may be located remotely from an enterprise. In some embodiments, multiple different computer systems supporting different services may be situated in a single geographical location, such as on-premises of an enterprise. In the example shown in FIG. 1, on-premises enterprise computer system 150 may include an HR system 154 and a CRM system 156, both of which may be located on-premises of an enterprise. In some embodiments, enterprise computer system 140 may include or implement an agent system to facilitate or handle communication between cloud computer system 110 and one or more enterprise systems 154, 156. Enterprise computer systems, such as cloud enterprise computer system 140 and on-premises enterprise computer system 150 are described below in further detail.

Computer system 100 may include a cloud service 112 implemented to operate as a secure intermediary computing environment that may facilitate communication between the computing device 102 and one or more enterprise computer systems because computing device 102 may not be configured to communicate with such enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. Cloud service 112 may support communication with different types of mobile computing devices. As such, cloud service 112 may implement techniques to facilitate communication between enterprise computer systems and mobile computing devices to enable them to communicate with each other despite their incompatibilities in communication, such as differences between formats or communication protocols. For example, cloud service 112 may translate communication protocols between mobile computing devices and enterprise computer systems.

Cloud service 112 may be implemented to provide access to a custom execution environment for execution of custom executable instructions. A custom execution environment may enable a user (e.g., a developer or an administrator) to execute custom instructions. The custom instructions may be executed to manage, configure, or operate cloud service 112. For example, cloud service 112 may facilitate execution of a custom executable instruction in a custom execution environment (e.g., "a custom code container"), such as a child execution environment 134. The custom execution environment may be established based on a template execution environment 132. Template execution environment 132 may be configured such that child execution environment 134 can be created based on a configuration of template execution environment 132. Child execution environment 134 may be established for different custom executable instructions. Each child execution environment 134 may represent a secure environment in which a custom executable instruction may be executed without having access to resources beyond those accessible to child execution environment 134. Child execution environment 134 may be a sandbox-like computing environment, which cannot be accessed by other processes executing by cloud service 112. Child execution environment 134 may prevent an executable instruction, executing in the environment, from establishing one or more other execution environments. Access permissions in a child execution environment 134 may be modified after the environment is established so that access from within child execution environment 134 may be configured as described above. Execution of custom executable instructions is described further below and with reference to FIGS. 2-5.

Cloud computer system 110 may support cloud service 112. Cloud computer system 110 may be implemented using hardware, software, firmware, or combinations thereof. For example, cloud computer system 110 may include one or more computing devices, such as a server computer. Cloud computer system 110 may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache). Cloud computer system 110 may include one or more different types of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases 170 (e.g., a document database, a relational database, or other type of database), one or more data stores (e.g., a metadata repository 124), one or more file stores, one or more file systems, or combinations thereof. The local storage may store enterprise data. In certain embodiments, cloud computer system 110 may include one or more data stores, which may be accessible by any component in cloud computer system 110.

Metadata repository 124 may store all the metadata associated with cloud service 112. This information may be composed of both run-time and design-time data, each having their own requirements on availability and performance. A tenant or subscriber of cloud service 112 may have any number of applications. Each application may be versioned and may have an associated zero or more versioned resource APIs and zero or more versioned services implementations those resource application programming interface (API) contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 124 may store one or more callable interfaces 114, which may be invoked by a computing device (e.g., computing device 102). Callable interface 114 may be customizable by a user (e.g., a developer) of an application to facilitate communication with cloud service 112. Metadata repository 124 may store metadata corresponding to one or more configurations of a callable interface. Metadata repository 124 may be configured to store metadata for implementing one or more callable interfaces 114, e.g., an asset interface. Callable interface 114 may be implemented to translate between a one format, protocol, or architectural style for communication and another format, protocol, or architectural style for communication. Metadata repository 124 may be modifiable by an authenticated user via the external network. Cloud computer system 110 may include other data stores, such as a diagnostics store that may store diagnostics information about processing occurring in cloud service 112 and an analytics store that may store logging and analytics data captured during processing in the system.

In some embodiments, metadata repository 124 may store information about one or more template execution environments. The information may be configured by a user through interface 114. The information about a template execution environment may include a template identifier, a template type, a template version, supported service/versions, name, description, other attribute related to the template execution environment, or combinations thereof.

On behalf of cloud service 112, cloud computer system 110 may utilize its computing resources to facilitate execution of custom executable instructions. Computing resources may be allocated for use with respect to a particular user associated as a subscriber or tenant to cloud service 112. Resources may be allocated with respect to a user, a device, an application, or other criterion related to a subscriber. Cloud service 112 may be scaled in or out, depending on the demand of mobile computing devices seeking to communicate with enterprise computer systems. Cloud service 112 can be configured such that it is elastic to handle surges and temporary periods of higher than normal traffic between mobile computing devices and enterprise computer systems. In some embodiments, cloud service 112 may include elements that support scalability such that components may be added or replaced to satisfy demand in communication.

A computing device 102 and a computing device 104 may communicate (e.g., send a request message) with cloud service 112. Computing device 102 may send a request to cloud service 112 for a service provided by an enterprise computer system and/or cloud service 112. Computing device 104 may be implemented to provide one or more user interfaces 106, such as a graphical user interface (GUI) to a user of computing device 104. User interface 106 may be a console that provides an administrator and/or a developer with access to cloud service 112. A user of computing device 104 may operate cloud service 112 via user interface 106. Cloud service 112 may be configured using user interface 104. In some embodiments, a template execution environment and/or a custom executable instruction may be configured or defined via user interface 104. User interface 104 may be configured to communicate with cloud service via interface 114 to configure operation of cloud service 112.

Computing device 102 (e.g., a mobile computing device) and computing device 104 may be implemented using hardware, firmware, software, or combinations thereof. Computing device 102 may communicate with enterprise computer systems 140, 150 via cloud service 112. Computing device 102 and computing device 104 may each include or may be implemented as an endpoint device, a personal digital assistant (PDA), a tablet computer, a laptop computer, a mobile computing device, a desktop computer, a wearable computer, a pager, etc. Computing device 102 and computing device 104 may each include one or more memory storage devices and one or more processors. Computing device 102 and computing device 104 may each include different kinds of operating systems. In some embodiments, cloud service 112 may include one or more runtime environments (e.g., a server process). The runtime environment may be implemented by cloud computer system 110. For example, cloud computer system 110 may implement one or more virtual machine environments, e.g., Java® virtual machine environment (JVM), which serves as a runtime environment for cloud service 112. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data. In some embodiments, local storage of computing device 102 may include one or more custom executable instructions that may be executed in a child execution environment 134 provided by cloud service 112.

In various embodiments, computing device 102 may be configured to execute and operate one or more applications such as a web browser, a client application, a proprietary client application, or the like. The applications can include specific applications configured for enterprise data and/or services provided by an enterprise computer system. Client applications may be accessible or operated via one or more network(s). Applications may include a GUI for operating the application.

Computing device 102 may communicate with cloud service 112 via one or more communication networks using wireless communication. Examples of communication networks may include a mobile network, a wireless network, a cellular network, a local area network (LAN), a wide area network (WAN), other wireless communication networks, or combinations thereof. In certain embodiments, computing device 102 may establish a communication connection 114 with cloud service 112 using a custom communication protocol (e.g., a custom protocol). Connection 114 may be established with cloud service 112 through cloud computer system 110. The custom protocol may be a Hypertext Transfer Protocol (HTTP)-based protocol. By utilizing a custom communication protocol, computing device 102 may operate on any computing device platform to communicate with cloud computer system 110.

Computing device 102 may communicate with cloud computer system 110 through one or more callable interfaces, e.g., application programming interfaces (APIs), such as interface 114. A callable interface may be implemented on computing device 102. The callable interface may be implemented for custom applications that enable those applications to communicate with cloud service 112. In some embodiments, a callable interface may be developed for cloud service 112. The callable interface may enable applications to communicate with cloud service 112 without having to adapt to differences in protocols (e.g., communication or development protocols) and/or architectural styles or formats.

Cloud service 112 may be protected by one or more firewalls to provide a secure environment to process requests and execute custom code 116. Communication of messages (e.g., HTTP messages or REST messages) between computing device 102 and cloud service 112 may conform to a communication protocol (e.g., HTTP or REST), which may be supported by a callable interface. Communication of messages between cloud computer system 110 and enterprise computer systems 140, 150 may conform to a communication protocol (e.g., HTTP or REST). Communication between computing device 102 and enterprise computer systems 140, 150 may be two-way via cloud service 112.

Cloud computer system 110 may further operate as an intermediary computing environment by communicating with enterprise computer systems, some of which may have different communication protocols. Such communication protocols may be custom or specific to an application or service in communication with cloud computer system 110. Further, cloud computer system 110 may communicate with an enterprise computer system to provide enterprise services and/or to exchange enterprise data according to a format supported by the enterprise computer system. Cloud computer system 110 may maintain local storage (e.g., local cache) of enterprise data and may use the local storage to manage synchronization of the enterprise data between mobile computing devices and enterprise computer systems 140, 150.

Computing device 102 may communicate (e.g., send a request message) with cloud service 112 to communicate a message (e.g., request a service) to an enterprise computer system and/or to request a service (e.g., execute one or more custom executable instructions) from custom execution service 130. Requests that are received through firewall may be processed to determine security authentication for a user associated with a request. The security mechanisms described herein may protect the integrity of customer communications and enterprise data. To prevent or reduce compromised communications and/or data from being compromised, authentication may occur initially, restricting access to only those who have the required credentials. The services and service invocation flow are structured so that as requests come in they may only be able to access services for which they are authorized. By decoupling authorization from the rest of the system processing, the task of authorizing "what can be done by whom" can be delegated to a dedicated provisioned security subsystem (e.g., an identity management system) that may be expanded to support whatever additional custom security measures are required by a specific corporate customer. In some embodiments, security authentication may be determined for a request, a session, a user, a device, other criterion related to the user, or combinations thereof. Security authentication may be performed for each request that is received. In some embodiments, authentication may be determined based on a previous verification of a request. Security authentication may be determined for a user or a device such that requests to different enterprise computer systems 140, 150 may be authenticated based on a single verification of security.

Cloud computer system 110 may include, implement, and/or communicate with one or more load balancer systems 108. Upon determining security authentication, cloud computer system 110 may request any one of load balancer systems 108 to examine a request that it receives and to detect which service the request is directed to. Cloud service 112 may be configured with load balancer system 108 and updated with resources that get started up, so that when a request comes in, load balancer system 108 can balance a requested load across the different resources.

Cloud computer system 110 may include a dispatcher 118 that may handle requests and dispatch them to the appropriate service. A request may be routed to an appropriate service upon dispatch. In some embodiments, a service itself may route an internal request to another internal service in cloud service 112 or in an enterprise computer system. In some embodiments, dispatcher 118 may resolve a request to determine its destination based on a location (e.g., an address) of a destination identified in a uniform resource identifier (URI) and/or a uniform resource locator (URL) of the request. Dispatcher 118 may parse a request and its header to extract one or more of the following information: tenant identifier, service identifier, application name, application version, request resource, operation and parameters, etc. Dispatcher 118 can use the parsed information to perform a lookup in metadata repository 124. Dispatcher 118 may retrieve a corresponding data for a request. Dispatcher 118 may determine the target service based on the requested resource and the mappings in the data. While initially a very basic mapping, the data can be enhanced to provide for more sophisticated, rules-based dispatching. Dispatcher 118 may perform any dispatcher-specific logging, metrics gathering, etc. Dispatcher 118 may then perform initial authorization according to the application metadata. Dispatcher 118 may format the inbound request and any other necessary information and place the message on a queue of routing bus 120 for further processing. Dispatcher 118 may await the corresponding response once a message is placed on the queue of routing bus 120. Dispatcher 118 may process responses received from routing bus 120 and return a response to computing device 102.

In addition to handling the dispatching for external requests, dispatcher 118 may also play a role in dispatching internal requests. Such internal requests can come in the form of composite services or custom executable instructions for a service. In both cases, the caller could use a logical service name as defined within the application. Dispatcher 118 may use the current execution context to determine the application and use that logical name to determine the appropriate service to invoke.

Cloud computer system 110 may include a routing bus 120 to manage deliver of messages to destinations registered with routing bus 120. Routing bus 120 may operate as a central system for managing communications in cloud service 112. Data communicated through routing bus 120 may be processed to capture and store the data. Routing bus 120 may provide a framework so that additional centralized services (additional authorization, debugging, etc.) can be plugged in easily as necessary. Data captured by routing bus 120 may be stored in diagnostics store 126 and/or analytics store 128.

Routing bus 120 may route messages to one or more destinations. A message may include a request for one or more services 126 provided by cloud service 112. A message may be received for communication to one or more enterprise computer systems 140, 150. Cloud service may provide services 126 such as an object store service, a database service, a notification service, a web service, a social service, a resource service, custom execution service 130, or combinations thereof. Routing bus 120 may process a request to determine its destination. A message directed to an enterprise computer system may be passed on to a destination enterprise computer system determined based on information in the message. Routing bus 120 may request an adaptor interface 122 to perform translations, if necessary, to pass a request to an enterprise computer system, e.g., enterprise computer system 140 or enterprise computer system 150. Routing bus 120 may pass on a message including a request to one or more services 126, 130 determined based on information included in the message.

In certain embodiments, cloud computer system 110 may include or implement adaptor interface 122 to translate or convert a message to a protocol supported by a receiving enterprise computer system. Adaptor interface 122 may establish separate communication connections with each of enterprise computer systems 140, 150. Cloud computer system 110 may be configured to communicate with enterprise computer systems 140, 150 via one or more networks (not shown). Examples of communication networks may include the Internet, a mobile network, a public network, a wireless network, a cellular network, a local area network (LAN), a wide area network (WAN), other communication networks, or combinations thereof. In certain embodiments, communication connections may be high-speed communication connections facilitated using high-speed communication trunks. Communication with an enterprise computer system 140, 150 may pass through a firewall, which ensures that communication with an external network is secure to prevent unauthorized access to cloud service 112 via such communications.

One service 126 provided by cloud service 112 may include an object store service that may provide a storage facility for BLOBs. The basic unit of storage can be text, with read and write operations. A basic query facility for JSON objects may also be offered.

Another service 126 provided by cloud service 112 may include a database service to allow connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Another service 126 provided by cloud service 112 may include social services, which may provide basic integration with many of the popular social sites such as Facebook®, Twitter®, etc. A social service may allow for third party authentication using the user's credentials from those sites as well as access to their services. Examples include sending a tweet or updating your status.

Another service 126 provided by cloud service 112 may include a public cloud service to enable a user to simplify and optimize communication. For example, a service developer may use the generic web service of cloud service 112 to talk to a resource hosted using cloud computer system's 110 cloud service.

Custom execution service 130 may establish one or more custom execution environments, e.g., child execution environments 134, to execute custom executable instructions. A custom executable instruction may be received in a message from computing device 102 and/or retrieved from a data store, e.g., metadata repository 124, accessible to cloud computer system 110. Child execution environment 134 may be established based on template execution environment 132. Cloud service 112 may manage information in metadata repository 124 about one or more template execution environments 132. A template execution environment 132 may be a code-specific virtual machine environment, e.g., a JVM environment. A child execution environment may be established based on template execution environment. A child execution environment may include or implement a child code-specific virtual machine environment, e.g., a child JVM environment. As such, child execution environment 134 may include information (e.g., a setting, an attribute, a variable, a state, or the like) copied, inherited, and/or derived from template execution environment 132. An example of child execution environment 134 established based on template execution environment 132 is described with reference to FIGS. 2 and 3.

Custom execution service 130 may implement one or more operations to process a request to execute a custom executable instruction. One such operation may include determining the custom executable instruction. A custom executable instruction may be identified by a request or may be included in a request.

Another such operation performed by custom execution service 130 may include determining a template execution environment 132 from which to establish a child execution environment. A template execution environment may be chosen based on one or more criterion, such as a type of custom executable instruction, one or more resources for execution of a custom executable instruction, a type of language associated with a custom executable instruction, other criterion related to execution of a custom executable instruction, or combinations thereof. A selected template execution environment may be executed before, after, or concurrently with receiving a request to execute custom execution instructions. As explained above, template execution environment 132 may be configured by a user, such as through computing device 104.

To establish a child execution environment, custom execution service 130 may perform one or more operations. An operation to establish a child execution environment may include issuing a command (e.g., a fork( ) command) or an instruction, which causes a child execution environment to be established (e.g., spawned) based the selected template execution environment. One or more custom executable instructions may be loaded for execution in the child execution environment. A custom executable instruction may be loaded before a child execution environment is established to further improve processing time for execution of the instruction. A child execution environment may be configured to adjust an environment of the child execution environment. The environment may include settings and/or access permission. For example, access permission may be stripped or altered to configure access permission to an instruction executing in the environment. Once configured, a custom executable instruction may be executed in the child execution environment.

Upon execution of a custom executable instruction in a child execution environment 134, a result may be produced by child execution environment 134. The result may be provided to custom execution service 130. Custom execution service 130 may perform one or more operations based on the result. The result may include a code or a value indicating an outcome of executing a custom executable instruction. Custom execution service 130 may re-execute the custom executable instruction if it was not executed successfully. Based on a result, custom execution service 130 may place a message (e.g., a response) on a queue of routing bus 120 to deliver to a computing device, e.g., computing device that requested the execution of the custom executable instruction. The message may include information indicating the result.

In some embodiments, template execution environment 132 and/or child execution environment 134 may access resources (e.g., metadata repository 124) or services 126, 130 available from cloud computer system 110. For example, such resources may include information or data stored by cloud computer system 110. Access may be obtained using one or more callable interfaces and/or libraries (e.g., SDK 136 or SDK 138), which may be included in the environment or which may be used by the environment to access a resource or a service. For example, SDK 136 or SDK 138 may be called by template execution environment 132 or child execution environment 134, respectively, to invoke a service provided by cloud computer system 110.

In some embodiments, cloud computer system 110 may facilitate notifications to a user of computing device 102. Cloud computer system 110 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

A cloud computer system, such as one described herein, may provide many technical advantages and benefits to it users. One technical advantage may include enabling a user of a mobile computing device (e.g., a mobile phone) to execute custom code in a secure execution environment (e.g., a sandboxed container), such as in a cloud computer system, which may provide necessary computing resources to support execution of the code. Another technical advantage may be that the secure execution environment to execute custom code may further enable custom code to be executed separately and independently from different users (e.g., subscribers or tenants). Yet another technical advantage may be that the secure execution environment may be customizable using a template, which can enable multiple instances of an execution environment to be established to concurrently execute custom code. The template may be configured to run different types of custom code or operations. By providing a secure custom environment for execution of custom code, users, administrators, and developers, may execute different types of custom code without interfering with or affecting the operation of other execution environments. Yet another technical advantage may include improving processing efficiency for execution of custom code as a template environment may reduce time to configure and establish custom execution environments and may enable different custom code to execute without depending on resources of another environment. By establishing custom execution environments, custom code may be prevented from consuming too many resources for execution of the code and the custom code may be prevented from spawning additional processes or environments that may enable access to unauthorized resources in the cloud computer system.

Figure 2:
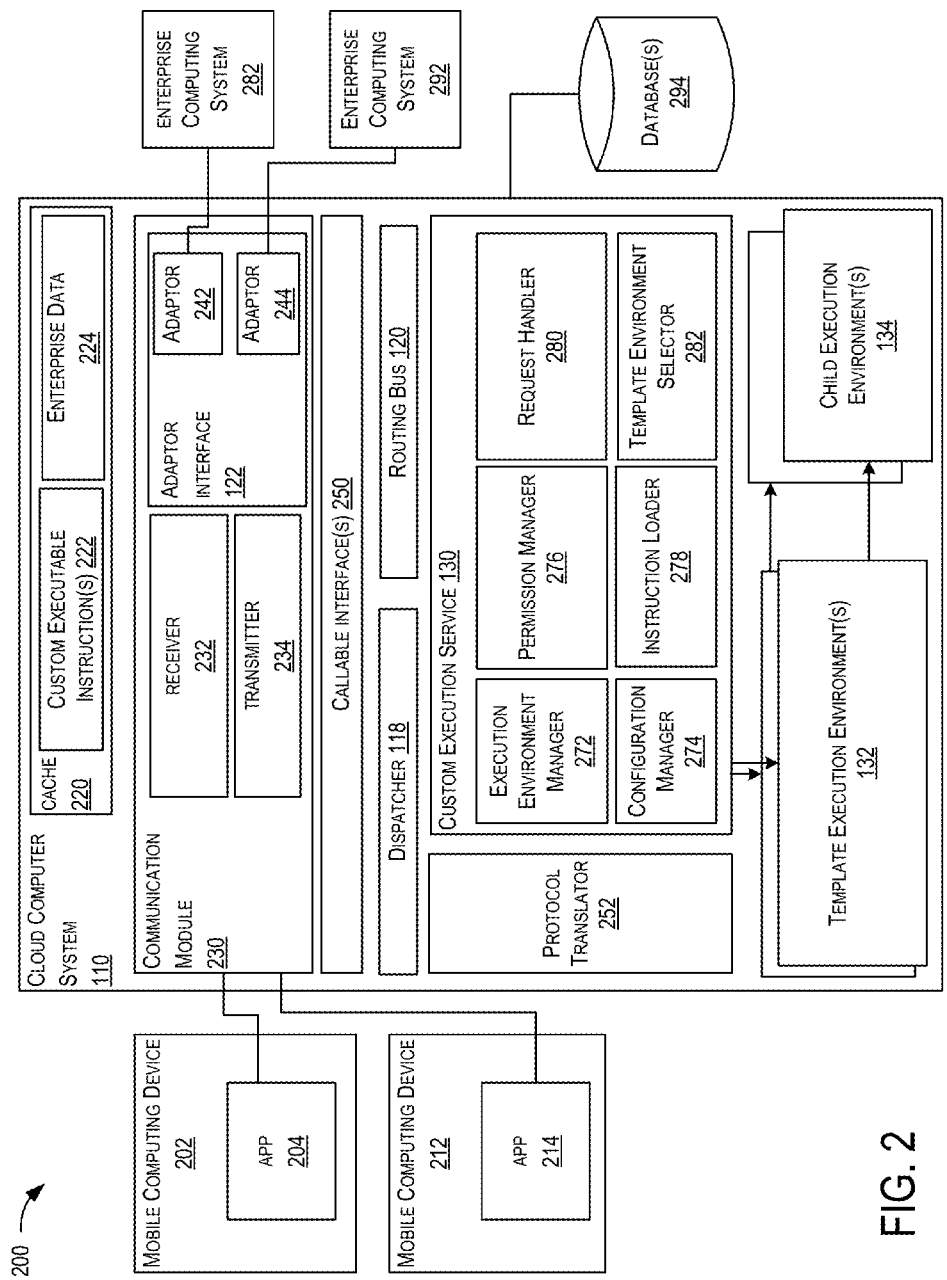
FIG. 2 shows a block diagram of a computer system to provide access to a custom execution environment for execution of custom executable instructions according to some embodiments of the present invention.

Now turning to FIG. 2, a block diagram is shown of a computer system 200 that may provide access to a custom execution environment for execution of custom executable instructions according to some embodiments of the present invention. Computer system 200 may include cloud computer system 110. In certain embodiments, cloud computer system 110 may be implemented as one or more functional blocks or modules configured to perform various operations for facilitating communication between computing devices (e.g., mobile computing device 202 and mobile computing device 212) and enterprise computer systems (e.g., enterprise computer system 282 and enterprise computer system 292). Cloud computer system 110 may include a communication module 230, a callable interface 250, a custom execution service 130, dispatcher 118, a routing bus 120, and a protocol translator 252.

Cloud computer system 110 may include one or more memory storage devices ("local storage"). The memory storage device may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data. In some embodiments, cloud computer system 110 may include cache 220, which may be used as local storage to store enterprise data 224 and one or more custom executable instruction(s) 222. Enterprise data 224 may be received from enterprise computer systems 282, 292 or from mobile computing devices 202, 212 or may include enterprise data converted by cloud computer system 110, or combinations thereof. One or more custom executable instructions 222 may be stored in cache 220. In some embodiments, cloud computer system 110 may have access to one or more databases 294, which serves as local storage for cloud computer system 110. Database 294 may have a greater storage capacity and may manage data in its storage. Database 294 may store custom executable instruction(s) 222, which can be loaded into cache 222 upon retrieval from database 294. Database 294 and/or cache 220 may store information corresponding to one or more template execution environments. In some embodiments, database 294 may include or implement metadata repository 124.

Communication module 230 may be configured to manage communications between cloud computer system 110 and multiple enterprise computer systems, e.g., enterprise computer systems 282, 292. Communication module 230 may be configured to manage communications between cloud computer system 110 and one or more computing devices, e.g., mobile computing device 202 and mobile computing device 212. To facilitate communication, communication module 230 may be equipped with hardware to enable communication, such as a receiver 232 and a transmitter 234, or a combination thereof.

Enterprise computer systems, such as enterprise computer systems 282, 292, may be physically located at a different geographic location (e.g., remote geographic location) than cloud computer system 110. In some embodiments, enterprise computer system 282 may be different from enterprise computer system 292. In some embodiments, enterprise computer system 282 and enterprise computer system 292 may be part of a single computing system. Each of enterprise computer systems 282, 292 may communicate with cloud computer system 110 using a different communication protocols. In some embodiments, enterprise computer system 282 and/or enterprise computer system 292 may be implemented as enterprise computer system 150, which may include an agent system, to handle communication with multiple enterprise computer systems.

In certain embodiments, one or more of enterprise computer systems 282, 292 may communicate with cloud computer system 110 using a HTTP-based protocol. In some embodiments, enterprise computer systems 282, 292 may communicate with cloud computer system 110 using a REST or SOAP communication protocols. For example, REST protocol may support a format including URI or URL. Enterprise data formatted for communication using REST protocol may be easily converted to a data format such as JSON, comma-separated values (CSV), and really simple syndication (RSS). Enterprise computer systems 282, 292 and cloud computer system 110 may communicate using other protocols such as remote procedure calls (RPC) (e.g., XML RPC).

In some embodiments, cloud computer system 110 and enterprise computer systems 282, 292 may communicate using communication connections that support high-speed communication. Communication module 230 may maintain high-speed communication connections may enable cloud computer system 110 to maintain on going and multiple communications with enterprise computer systems 282, 292 for managing and/or synchronizing communication to exchange enterprise data or deliver requested services. The high-speed communication connections may afford cloud computer system 110 the ability to handle multiple communications with enterprise computer systems to fully synchronize enterprise data, whereas a mobile computing device may be limited in bandwidth of a wireless communication connection to constantly receive enterprise data. The communication connection between cloud computer system 110 and an enterprise computer system may be reliable such that cloud computer system 110 may receive and send communications to synchronize enterprise data with little or no interruption.

In some embodiments, communication module 230 may include an adaptor interface 122 configured to support communication with enterprise computer systems, some of which may support different protocols or techniques for communications. Adaptor interface 122 may include one or more adaptors, e.g., adaptor 242 or adaptor 244, each of which may be configured to communicate according to a communication protocol, a type of enterprise computer system, a type of application, a type of service, or combinations thereof. A communication protocol supported by an adaptor may be specific to one or more enterprise computer systems. For example, communication module 230 may include an adaptor 242 configured for communication with enterprise computer system 282 using a specific protocol supported by enterprise computer system 282. In another example, communication module 230 may include an adaptor 244 configured for communication with enterprise computer system 292 using a specific protocol supported by enterprise computer system 292. Adaptor interface 122 may establish separate communication connections with each of enterprise computer systems 282, 292. In some embodiments, adaptor interface 122 may be configured to communicate with an agent system, which may be included or implemented by an enterprise computer system. An adaptor in adaptor interface 122 may be configured to communicate according to a custom protocol used for communication with an agent system. The custom protocol may be specific to a type of agent system or an enterprise computer system in which an agent system supports. The adaptor interface may reduce or eliminate a need for an app, e.g., app 204 or app 214, to be developed specifically to support communication with a particular enterprise computer system.

Cloud computer system 110 may use communication module 230 to communicate with mobile computing devices, e.g., mobile computing devices 202, 212. Mobile computing devices may be situated in a different geographical location than cloud computer system 110. For example, mobile computing devices 202, 212 may be physically located beyond a firewall (e.g., firewall 104) of cloud computer system 110 at a different geographic location (e.g., remote geographic location) than cloud computer system 110. Each of mobile computing devices 202, 212 may communicate with cloud computer system 110 using a different communication protocol. In certain embodiments, one or more of mobile computing devices 202, 212 may communicate with cloud computer system 110 using a HTTP-based communication protocol. In some embodiments, communication module 230 may communicate with mobile computing devices using a custom communication protocol. The custom communication protocol may be a HTTP-based communication protocol. The communication protocol used for communication between mobile computing devices 202, 212 may support communication of enterprise data structured in different formats (e.g., JSON format), which may be easily readable by mobile computing devices 202, 212 and cloud computer system 110.

In certain embodiments, mobile computing devices 202, 212 may each implement an application (an "app") that can provide specific user interfaces to communicate with cloud computer system 110. A specific UI may be configured to communicate using a specific communication protocol. In some embodiments, specific UIs may include callable interfaces, functions, routines, methods, and/or operations that may be invoked to communicate with cloud computer system 110. Specific UIs may accept as input parameters for communicating with enterprise computer systems for enterprise data and/or to request a service. A request for a service may include a request to execute one or more custom executable instructions, e.g., custom executable instruction(s) 222. In some embodiments, communication through an app 204, 214 may be converted for communication using a custom communication protocol. App 204, 214 may be configured to process data received from cloud computer system 110. Data may include a response indicating a result of executing one or more custom executable instructions. In certain embodiments, specific UIs may be included or implemented by cloud computer system 110. In some embodiments, specific UIs may correspond to a custom client in an application.

Cloud computer system 110 may include one or more callable interfaces 250, e.g., an application programming interface (API). Callable interface 250 may enable an app on a mobile computing device to communicate requests to cloud service 112. Callable interface 250 may support a common or standard interface, which may allow requests including their parameters to be received from apps according to a standardized protocol, architectural style, and/or format (e.g., a REST protocol). Callable interface 250 may be configurable by a user of any one of computing devices 202, 212. Callable interface 250 may receive requests for services according to a communication protocol. For example, callable interface 250 may be a REST API that supports requests according to a REST protocol. In some embodiments, callable interface 250 may receive messages from mobile computing devices. Callable interface 250 may be configured to translate or convert messages received from mobile computing devices according to a format supported by callable interface 250. Device application developers can connect to cloud service 112 for their custom applications. In some embodiments, a callable interface 250 may be configured by the same person that develops an app, such that the person can implement a custom app to communicate with cloud service 112.

Callable interface 250 may enable enterprise computer systems to communicate with cloud service 112 according to a standardized protocol or format. Similar to application developers, those who manage enterprise computer systems can implement code (e.g., an agent system) that is configured to communicate with cloud service 112 via callable interface 250. Callable interfaces 250 may be implemented based on a type of computing device, a type of enterprise computer systems, an app, an agent system, a service, a protocol, a type of custom executable instruction, other criterion, or combinations thereof. In some embodiments, callable interface 250 may support requests for services including authentication, compression, encryption, pagination with cursors, client-based throttling, non-repudiation, logging, and metrics collection. In some embodiments, callable interface 250 may be implemented for custom business-related services, such as authentication, policy enforcement, caching of responses, throttling of calls to cloud service 112, translation between asynchronous and synchronous patterns, logging of calls to underlying services, or combinations thereof. In some embodiments, callable interface 250 may enable users to provide custom executable instruction(s) for implementation by cloud computer system 110. The custom executable instructions may implement one or more callable interfaces 250 for cloud computer system 110, which can enable users to access custom services.

In some embodiments, callable interface 250 may include an asset interface (e.g., an asset catalog library), which may enable access to database 294. Access to database 294 may include access to metadata repository 124. Any element of cloud computer system or an external computing device, e.g., mobile computing device 202 or mobile computing device 212, may access metadata repository 124 via the asset interface. For example, a developer or an administrator may access information in database 294 using an app or a user interface. In some embodiments, dispatcher 118 may access database 294 using callable interface 250 to determine a service (e.g., custom execution service 130) to be invoked for a request.

Protocol translator 252 may process a message to determine a communication protocol for a message and/or to convert a message to a communication protocol for a destination. A destination may include one or more enterprise computer systems 282, 292 and/or custom execution service 130. Protocol translator 252 may convert a request received from one of mobile computing devices 202, 212. The request may be converted from a format of a communication protocol supported by or mobile computing device 202 or mobile computing device 212 to a format of a communication protocol supported by enterprise computer system 282 or enterprise computer system 292. Protocol translator 252 may convert a response received from enterprise computer systems 282, 292. A response may be converted from a format of a communication protocol supported by enterprise computer system 282 or enterprise computer system 292 to a format of a communication protocol supported by mobile computing device 202 or mobile computing device 212. In some embodiments, all or some of the operations performed by protocol translator 252 may be implemented in callable interface 250 and/or adaptor interface 222.

Custom execution service 130 may enable execution of one or more custom executable instructions (e.g., custom executable instruction(s) 222) in a custom executable environment (e.g., a child execution environment). Custom execution service 130 may process a request to execute a custom executable instruction. The request may be processed to determine a type of custom executable environment to execute the custom executable instruction and to establish, based on the type of custom executable environment, one or more custom execution environments to execute the custom executable instruction. Custom execution service 130 may be implemented as one or more functional blocks or modules configured to perform various operations authenticating security of a request. Custom execution service 130 may include an execution environment manager 272, a configuration manager 274, a permission manager 276, an instruction loader 278, a request handler 280, and a template environment selector 282.

As explained earlier, a template execution environment may be configured by a user. The user may be associated with the one of mobile computing devices 202, 212. One or more criterion to define and/or configure a template execution environment may be received via a callable interface 250. Configuration manager 274 may manage configuration of a template execution environment. Configuration manager 274 may receive one or more criterion to configure a template execution environment via callable interface 250. The one or more criterion may be stored in database 294. Configuration manager 274 may identify a template execution environment based on one or more criterion. A template execution environment may be identified by searching database 294 using the one or more criterion.

Request handler 280 may manage requests received to execute a custom executable instruction. Request handler 280 may process a request to determine a template execution environment to invoke to execute a custom executable instruction. A request may include a type of service requested, a type of execution environment, information identifying one or more custom executable instructions, other criterion to identify custom executable instructions, or combinations thereof. A request may be processed to determine information identifying a source of custom executable instructions. In some embodiments, a request may be processed to identify one or more custom executable instructions to be executed in a custom execution environment. The information parsed from a request may be used by template environment selector 282 to choose one or more template execution environments to execute a custom executable instruction.

Request handler 280 may manage responses received from a child execution environment upon execution of a custom executable instruction. A response may be processed to determine one or more custom executable instructions to execute in a child execution environment. The child execution environment may be one that has already been established. A result may be processed to determine the result or condition code indicating an outcome for execution of a custom executable instruction. The result may include other information generated as a result of execution of the custom executable instruction. Request handler 280 may determine a subsequent operation (e.g., send a request) to perform based on information determined from a result. In the event that a result indicates a custom executable instruction was not processed or encountered an error, request handler 280 may initiate execution of the same custom executable instruction. In the event that a result indicates a custom executable instruction was executed, request handler 280 may place a message (e.g., a response) on a queue of routing bus 120 to send to a requesting computing device. The message may include information indicating a result determined from a response received from a child execution environment. In the event that a result indicates a request to execute another custom executable instruction, request handler 280 may generate a request (e.g., place a request on queue of routing bus 120) to execute the requested custom executable instruction.

Template environment selector 282 may determine a template execution environment to use to establish a child execution environment. In some embodiments, cloud computer system 110 may store or access a data store including information about one or more template execution environments. A template execution environment may be selected by default or based on one or more criterion. The one or more criterion may include a type of custom executable instruction, one or more resources needed to execute a custom executable instruction, a type of security for execution of a custom executable instruction, a type of service to be performed, a type of user, other criterion related to execution of a custom executable instruction, or combinations thereof. One or more attributes of a template execution environment may be processed to select a template execution environment.

Based on a selected template execution environment, execution environment manager 272 may establish a child execution environment. Execution environment manager 272 may execute a template execution environment. A template execution environment may be executed before a request is received, or concurrently with or after receiving a request to execute a custom executable instruction. The child execution environment may be established using to a template execution environment. Establishing a child execution environment is described below with reference to FIG. 3.

Instruction loader 278 may load a requested custom executable instruction for execution in the first child execution environment. As explained above, a custom executable instruction may be previously prepared and stored in a data store accessible to cloud computer system 110. In some embodiments, to improved efficiency, a custom executable instruction may be loaded at different times, such as before a request is received or before a child execution environment has been established. Doing so, may provide a technical advantage of improving processing efficiency to load the custom executable instruction beforehand so as to reduce time to execute the instruction when requested to do so. A custom executable instruction may be loaded earlier as it may be an instruction that is called more frequently.

Permission manager 276 may manage permissions for a child execution environment. Permission manager 276 may configure an access permission for a child execution environment. The access permission may be determined based on information stored in association with a template execution environment used to establish a child execution environment. An access permission of a child execution environment may be configured for a child execution environment before execution of a custom executable instruction. Access permission may be configured based on a security model (e.g., a Java® security model). A security model may be configurable and stored in association with a template execution environment. The security model may define attributes and parameters related to access permission for a child execution environment. Permission manager 276 may handle configuration of a security model and may use a security model to configure access permission for a child execution environment.

Figure 3:
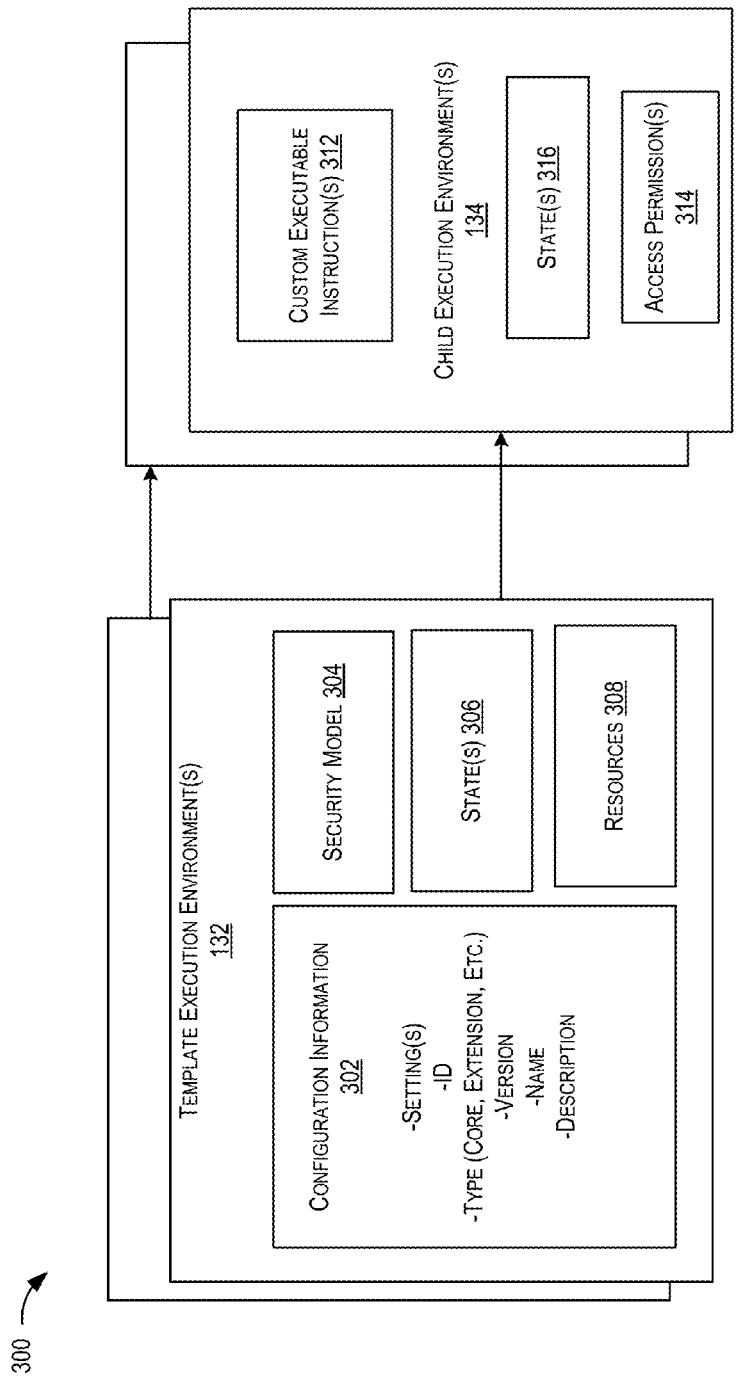
FIG. 3 shows a block diagram of a system including child execution environments established using a template execution environment to execute custom executable instructions according to some embodiments of the present invention.

FIG. 3 shows a block diagram of a system 400 including child execution environments established using a template execution environment to execute custom executable instructions according to some embodiments of the present invention. Specifically, system 300 shows how a child execution environment 134 may be established based on template execution environment 132. System 300 shows a configuration of template execution environment 132. Any number of child execution environments may be established from a template execution environment. Each child execution environment may be a distinct execution environment with a dedicated set of resources and access for execution of a custom executable instruction.

A template execution environment, e.g., template execution environment 132 may be associated with configuration information 302. Configuration information 302 may include information to configure and/or execute template execution environment 132. Configuration information 302 may be stored in metadata repository 124. Configuration information 302 may include one or more environment settings related to execution of template execution environment 132. As explained above, a template execution environment may be a code-specific virtual machine environment, e.g., a JVM environment. A code-specific virtual environment may enable execution or implementation of a specific type of code (e.g., Java®) to be executed in the environment. The environment settings may correspond to operation of the environment. Configuration information 302 may include an identifier of template execution environment 132, one or more types, one or more versions, one or more names, a description, or combinations thereof. The one or more types may correspond to an associated type of environment or instruction that can be executed in child execution environment 134 established based on template execution environment 132. Configuration information 302 may be based at least on one criterion related to a user (e.g., a subscriber or a tenant) registered with cloud computer system 110.

Template execution environment 132 may include a security model 304, which includes information indicating one or more access permissions for child execution environment 134 established based on template execution environment 132. Security model 304 may correspond to s security model corresponding to the environment, e.g., a security model of a code-specific virtual environment. Security model 304 may indicate access permission (e.g., socket permission) for one or more communication protocols and/or communication-related operations that may be permitted or denied.

Template execution environment 132 may include information identifying one or more states 306 related to establishing a child execution environment. One or more states 306 may indicate a state of a variable or a setting related to execution of a child execution environment.

Template execution environment 132 may include information identifying one or more resources 308 to load for child execution environment 134. A resource may include a class, a file, memory space, system files, or the like, some or all of which may be used during execution of child execution environment 134. In some embodiments, one or more resources 308 may be loaded for execution of template execution environment 132 before template execution environment 132 is executed. In some embodiments, a resource 308 may be loaded after a request is received.

Custom execution service 130 may establish child execution environment 134 based on template execution environment 132. Below is an example of pseudo-code that describes the type of operations performed by template execution environment 132 to establish a child execution environment.

Example Pseudo-Code

```
// Operations in a Template Execution Environment
while (true) {
   wait for request //
   // Determine user information from request
   obtain tenantInfo from request
   // Establish a Child Execution Environment
   result = primitiveProcessFork( )
   // Verify whether Child Execution Environment has been established
   if (result = childProcessResult) {
      break out of loop
   }
}
```

In the example above, template execution environment 132 may process a request when received from custom execution service 130. Information about a user may be extracted from the request. Then, template execution environment 132 may perform an operation to establish child execution environment 134. Such an operation may include issuing a command, which may be specific to a type of template execution environment 132. In this example, a fork( ) command may be issued, such as may be available in a JVM environment. The operation may result in the creation and execution of a child execution environment, e.g., a child code-specific virtual environment, e.g., a child JVM environment. Then, a result of performing the operation may be checked to determine whether the command was issued successfully.

Child execution environment 134 may be established as a secure, isolated execution environment, suitable for running one or more custom executable instructions 312. Child execution environment may be extensible and adapted to host custom executable instructions of other types of languages that may be supported or developed in the future. Upon establishing child execution environment, one or more operations may be performed by child execution environment, such as illustrated by the following pseudo-code:

```
// Operations in Child Execution Environment
retrieve user code from code store for specified tenant load user code
into JVM
initialize all SDK state for tenant-specific context
disable permissions for tenant user code (e.g. set new security Policy)
userResult = result of invoking user code entry point return
return userResult
```

Upon establishing child execution environment 134, one or more custom executable instructions 312 may be loaded into child execution environment 134. In some embodiments, custom executable instructions 312 may be loaded before establishing child execution environment 134. One or more state(s) settings of a callable interface (e.g., SDK 138) may be set (e.g., disabled) so that a custom executable instruction 312 may be limited to accessing certain services from cloud computer system 110. One or more access permissions 314 may be configured based on a security model 304 in template execution environment 132. An access permission may grant or deny one or more types of operations from being performed in child execution environment 134. By establishing child execution environment 134 based on template execution environment 132, child execution environment 134 may have a copy or a reference (e.g., a pointer) of information (e.g., configuration information 302, one or more states 306, and/or resources 308) associated with template execution environment 132. A technical advantage establishing a child execution environment based on a template execution environment is that such a technique may be used for high throughput situations were many processes executing multiple instances of custom executable instructions may use identical environments, which may be configured the same and executed in concurrently. By limiting access permissions, child execution environment 134 may be prevented from accessing certain resources and/or sensitive portions of a runtime environment of cloud computer system 110. Further, child execution environment 134 may be prevented from spawning or establishing additional processes or other execution environments, which may consume or hinder use of resources available in cloud computer system 110.

Figure 4:
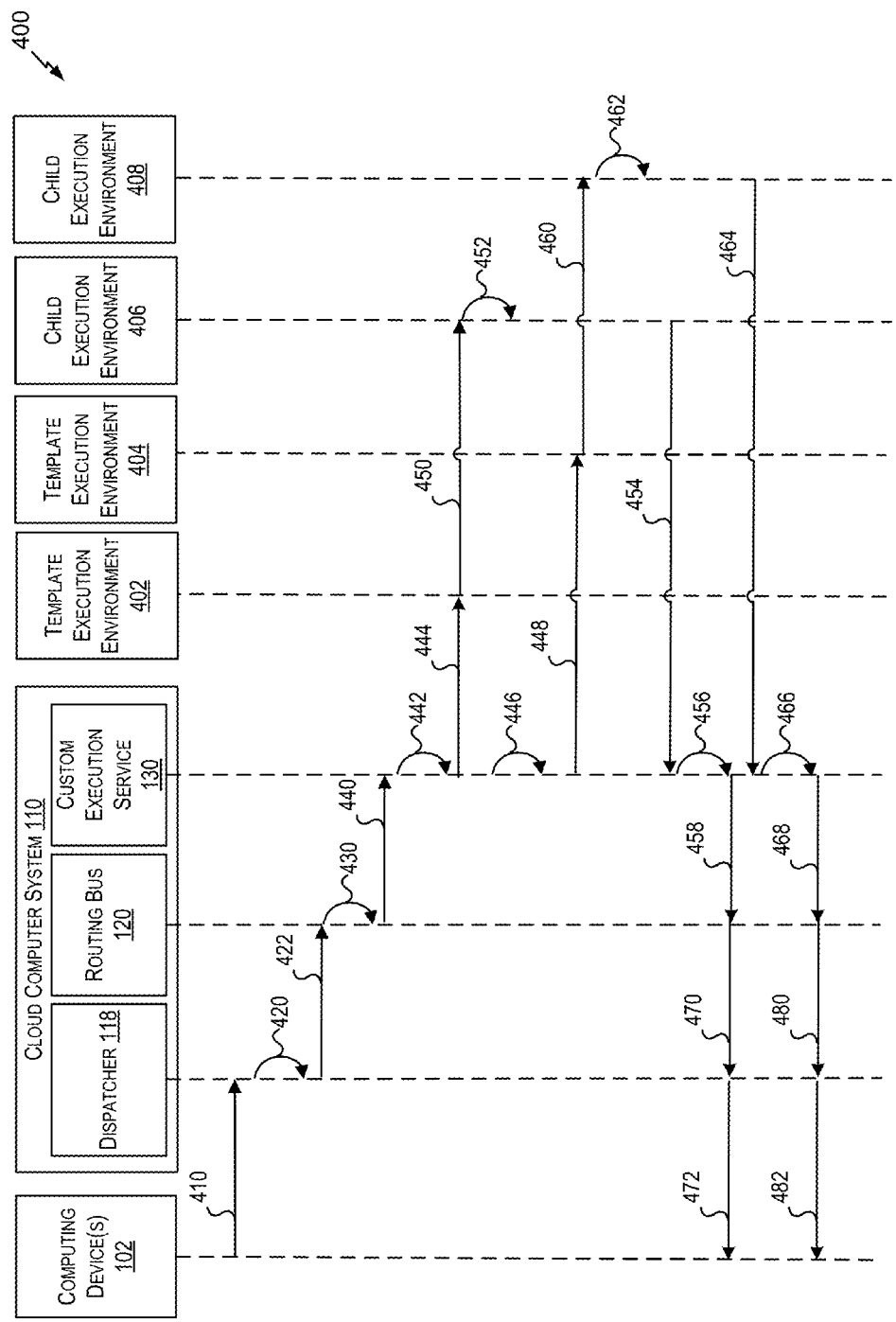
FIG. 4 shows a sequence diagram of a process for providing access to a custom execution environment for execution of custom executable instructions according to some embodiments of the present invention.

Now turning to FIG. 4, a sequence diagram is shown of a process 400 for providing access to a custom execution environment for execution of custom executable instructions according to some embodiments of the present invention. Specifically, process 400 may enable one or more custom execution instructions (e.g., custom executable instruction(s) 222 or custom executable instruction(s) 312) to be executed in one or more child execution environments 406, 408 (e.g., child execution environment(s) 134) configured based on one or more template execution environments 402, 404 (e.g., template execution environment(s) 132). As explained above, a cloud computer system (e.g., cloud computer system 110) of a cloud service may include a custom execution service (e.g., custom execution service 130) that may facilitate the establishment of one or more child execution environments to execute one or more custom executable instructions. Process 400 may enable a computing device (e.g., computing device 102) to communicate a request to cloud computer system 110 to implement one or more operations by executing one or more custom executable instructions. A request can be received from a mobile computing device that may be located at a different geographical location, physically separated from cloud computer system 110 and execution environments. Therefore, computing device 102 can communicate with cloud computer system 110 regardless of their respective locations.

Cloud computer system 110 may process a request to determine one or more custom executable instructions to execute and may establish an execution environment for the execution of those custom executable instructions. In some embodiments, cloud computer system 110 can process a request, which may not have an explicit request to execute one or more custom executable instructions, and may determine whether any custom executable instructions can be executed to satisfy the request. In some embodiments, cloud computer system 110 may identify one or more custom executable instructions that can be executed to provide a requested service. As explained in further detail below, cloud computer system 110 may establish a child execution environment 406, 408 based on a template execution environment 402, 404. The template execution environment may be selected based on information in a request, may be selected based on a type of service requested, or combinations thereof. Cloud computer system 110 may enable custom executable instructions to be provided for different services or type of operations as a basis for cloud computer system 110 selecting custom executable instructions to provide a service to a user. A child execution environment may provide a safe and secure environment that supports the execution of a custom executable instruction.

Process 400 is illustrated as a logical sequence diagram, the operation of which represents operations that may be implemented in hardware, computer instructions, or a combination thereof. In the context of computer instructions, the operations represent computer-executable instructions, stored on one or more computer-readable storage media, which when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

To begin process 400, computing device 102 may send data 410 (e.g., enterprise data) to cloud computer system 110. Data 410 may include one or more requests for a service, e.g., custom execution service. A request in data 410 may indicate a type of service requested, information identifying one or more custom executable instructions, information identifying a type of custom executable instruction, other criterion (e.g., a condition, a time period, or an environment state) for execution of a custom executable instruction, or combinations thereof. Data 410 may include a request for a service from an enterprise computer system. In some embodiments, enterprise data may include multiple requests. Each request may be for the same or a different service. Data 410 may include authentication information, such as user identification information, credentials, account information, or the like, some or all of which may be useful for determining security authenticating of a user associated with computing device 102. Communication between computing device 102 and cloud computer system 110 may be facilitated by use of a custom communication protocol.

Process 400 may include each request received in data 410 being processed by dispatcher 118. Dispatcher 118 may implement one or more operations 420 to process a request. An operation 420 may include directing a request to another component of cloud computer system 110. For example, dispatcher 118 may implement an operation 420 to route a request to one or more services, e.g., custom execution service 130, of cloud computer system 110. Dispatcher 118 may receive requests from computing device 102 via a load balancer. Another operation 420 by dispatcher 118 may include parsing a request to determine information in a request, such as a subscriber (e.g., tenant ID), a service ID, application name, application version, request resource, operation and parameters, etc. Dispatcher 118 can determine a target service based on the information parsed from a request. In some embodiments, a request may include information identifying a custom execution service (e.g., custom execution service 130) to invoke. In some embodiments, dispatcher 118 can receive requests internally sent by a component in cloud computer system 110, such as a service. Upon determining a target service, dispatcher 118 may store data 422 on a queue of routing bus 120. Data 422 may include a request identified from data 410. The data 422 may include a message that indicates a service selected based on the identified request. After placing a message on the queue of routing bus 120, dispatcher 118 may wait for other requests, or responses from routing bus 120 for a requested service.

Process 400 may include routing bus 120 implementing one or more operations 430. An operation 430 may include processing a message on a queue and delivering the message to a service identified by information in the message. Another operation 430 may include processing one or more responses received from a service. A response may be received for a service requested from computing device 102. Process 400 may include routing bus 120 sending a request 440 to custom execution service 130. A request processed off the queue may be directed to a service identified by the request.

Process 400 may include custom execution service 130 implementing one or more operations 442 for each request to execute custom executable instructions. A request directed from routing bus 120 may include information identifying a source of custom executable instructions. In some embodiments, a request may include information that can be used by custom execution service 130 to identify one or more custom executable instructions to be executed in a custom execution environment. A request may include a type of service requested, a type of execution environment, information identifying one or more custom executable instructions, other criterion to identify custom executable instructions, or combinations thereof.

One operation 442 implemented by custom execution service 130 may include processing the request to identify a one or more template execution environments 402, 404 to be used to configure a custom executable environment (e.g., a child execution environment) for the requested custom executable instructions. In some embodiments, a template execution environment may be a code-specific virtual machine environment (e.g., a JVM environment). A template execution environment may be chosen based on a type of custom executable instruction, a type of service requested, a type of user, or combinations thereof. For example, a template execution environment may be chosen for a user requesting execution of custom executable instructions. A template execution environment may be configured for a user and/or to execute certain types of instructions. In some embodiments, a request may include multiple requests or custom execution service 130 may identify multiple template execution environments to be used to establish one or more custom executable environments (e.g., a child execution environment) in which to execute the requested custom executable instructions.

Another operation 442 may include configuring a template execution environment. For example, a template execution environment may be configured based on a type of custom executable instruction requested for execution. In some embodiments, a template execution environment 402, 404 may be configured before a request is received to execute a custom executable instruction. In some embodiments, custom execution service 130 may implement one or more operations 446 for each template execution environment identified to establish a custom execution environment. One or more operations 446 may be similar to one or more operations 442. The operations 446 may include configuring a template execution environment, e.g., template execution environment 404.

Process 400 may include custom execution service 130 executing a template execution environment, e.g., template execution environment 402 or template execution environment 404. The template execution environment may be one that is identified for establishing a custom execution environment for a requested custom executable instruction. In the example shown in FIG. 4, process 400 may include custom execution service 130 implementing one or more operations 444 to execute a template execution environment 402 to establish a child execution environment 406. Executing a template execution environment may correspond to executing a code-specific virtual environment (e.g., a JVM environment). Process 400 may include custom execution service 130 implementing one or more operations 448 to execute a template execution environment 404 to establish a child execution environment 408. One or more operations 444 and one or more operations 448 may be implemented concurrently. Thus, template execution environment 402 and template execution environment 404 may be established concurrently. In some embodiments, one or more operations 448 for another template execution environment 404 may be implemented after one or more operations 446 (e.g., configuring template execution environment 404) are implemented. An operation (e.g., operation 444 or operation 448) implemented to execute a template execution environment (e.g., template execution environment 402 or template execution environment 404) may include implementing one or more instructions that cause the template execution environment to be executed. For example, operations may include initializing a template execution environment (e.g., a code-specific virtual machine) and executing the template execution environment. As explained earlier, a template execution environment may be executed before the template execution environment is used to establish a child execution environment.

Process 400 may include implementing one or more operations to establish a child execution environment based on a template execution environment. For example, process 400 may include implementing one or more operations 450 in template execution environment 402 to establish child execution environment 406 for execution of a custom executable instruction. In another example, process 400 may include implementing one or more operations 460 in template execution environment 404 to establish child execution environment 408 for execution of a custom executable instruction. One operation (e.g., operation 450 or operation 460) to establish a child execution environment may include implementing or executing an instruction or a command that causes a child execution environment to be established based on the template execution environment. For example, a code-specific instruction, such a fork( ) command in a JVM template execution environment, may be executed which causes (e.g., spawns) a child execution environment to be established. A child execution environment establishing based on a template execution environment may inherit a configuration of the template execution environment. The inherited configuration may include one or more of the following: a setting, a variable, a parameter, a state, a rule, other criterion related to operation or implementation of a child execution environment, or combinations thereof. Another operation (e.g., operation 450 or operation 460) to establish a child execution environment may include configuring one or more parameters of an instruction or a command prior to its implementation or execution. In some embodiments, template execution environment may be configured by changing a setting before execution of a command or an instruction to establish a child execution environment.

Process 400 may include implementing one or more operations in a child execution environment. The one or more operations may include executing a requested custom executable instruction in the child execution environment. For example, one or more operations 452 may be implemented in child execution environment 406. In another example, one or more operations 462 may be implemented in child execution environment 408. One operation (e.g., operation 452 or operation 462) to implement in a child execution environment may include loading a custom executable instruction requested by computing device 102. The custom executable instruction may be identified by custom execution service 130 based on a request received from computing device 102. A custom executable instruction may be loaded from a database associated with cloud computer system 110. Loading a custom executable instruction may include searching a database for the instruction based on one or more criterion (e.g., a type of service requested or a type of custom executable instruction) and retrieving the identified custom executable instruction. Another operation to implement in a child execution environment configuring one or more of the following: a variable, a setting, a state, an access permission, other criterion related to configuration of the child execution environment, or combinations thereof. For example, process 400 may include configuring an access permission for a child execution environment. The access permission may be configured for a child execution environment to remove the access permission or to limit the custom executable instruction from obtaining access to configuring the child execution environment during execution of the instruction. Another operation may include executing a requested custom executable instruction in the child execution environment after configuration of the child execution environment. Process 400 may include executing a custom executable instruction in a child execution environment 406 concurrently with executing a different child executable instruction in a different child execution environ 408.

In some embodiments, one or more operations described as being performed in a child execution environment may be performed in a template execution environment. For example, a custom executable instruction may be loaded in a template execution environment before a child execution environment is established. Similarly, configuration of a child execution environment may be performed before the child execution environment is established. A child execution environment may be configured and/or a custom executable instruction may be loaded before the child execution environment is established because doing so may improve execution time for executing the custom executable instruction. Such a technique may be implemented for a custom executable instruction that is executed more frequently so as to reduce processing time to execute the instruction.

In some embodiments, a requested custom executable instruction may be a gateway instruction or may be part of a gateway module that causes one or more other custom executable instructions to be executed. For example, execution of a custom executable instruction may cause another custom executable instruction to be loaded for execution in the child execution environment.

Process 400 may include a child execution environment returning a result to custom execution service 130. For example, child execution environment 406 may return a result 454 to custom execution service 130 and child execution environment 408 may return a result 464 to custom execution service 130. A result may be returned in response to execution of one or more custom executable instructions or may be returned upon completion of processing of a requested custom executable instruction. A result may include a value that indicates a condition or an outcome of executing a custom executable instruction. In some embodiments, a result may include information indicating or identifying one or more other custom executable instructions to be executed.

Process 400 may include custom execution service 130 performing one or more operations based on a result received from a child execution environment. For example, custom execution service 130 may perform one or more operations 456 based on a result 454 received from child execution environment 406. In another example, custom execution service may perform one or more operations 466 based on a result 464 received from child execution environment 408. In some embodiments, custom execution service 130 may perform one or more operations (e.g., an operation 456 and an operation 466) based on multiple results received from different child execution environments. One such operation (e.g., an operation 456 or an operation 466) may include processing a result to determine one or more custom executable instructions to execute in a child execution environment. The child execution environment may be one that has already been established. Another operation may include processing a result to determine the result or condition code indicating an outcome for execution of a custom executable instruction. The result may include other information generated as a result of execution of the custom executable instruction. Yet another operation may include generating a message for delivery to a computing device (e.g., computing device 102). The computing device may be one that requested execution of a custom executable instruction. The message may include information indicating a result of executing custom executable code. Custom execution service 130 may generate one or more messages for each result. In some embodiments, a single message may be generated for multiple results.

Process 400 may include custom execution service 130 placing a message on a queue of routing bus 120. Custom execution service 130 may place each message it generates on a queue of routing bus. For example, custom execution service 130 may place message 458 on a queue of routing bus 120. Message 458 may include information indicating a result of execution of a custom executable instruction in child execution environment 406. For example, custom execution service 130 may place message 468 on a queue of routing bus 120. Message 468 may include information indicating a result of execution of a custom executable instruction in child execution environment 408.

Process 400 may include routing bus 120 processing a message, e.g., message 458 or message 468, off a queue. The message, when processed, may be directed to dispatcher 118 for delivery to computing device 102. Dispatcher 118 may perform an operation 470 to pull message 458, 468 off a queue of routing bus 120. Subsequently, dispatcher 118 may send one or more responses (e.g., response 472 or response 482) to computing device 102 indicating information included in the message extracted off the queue. The response may indicate a result of executing a custom executable instruction.

It will be appreciated that process 400 is illustrative and that variations and modifications are possible. Steps described as sequential may be executed in parallel, order of steps may be varied, and steps may be modified, combined, added or omitted.

By executing a custom executable instruction in a child execution environment, the custom executable instruction may be executed in a sandboxed environment (e.g., the child execution environment) so as to not interfere with other operations (e.g., tenant operations) in a cloud computer system that are performed for its user (e.g., a tenant). By modifying (e.g., restricting) access permission in a child execution environment, a custom executable instruction may be prevented from spawning additional operations or threads not supported for execution in a child execution environment. By preventing unsupported threads or operations from being performed, computing resources may be reduced or conserved for the cloud computer system.

Figure 5:
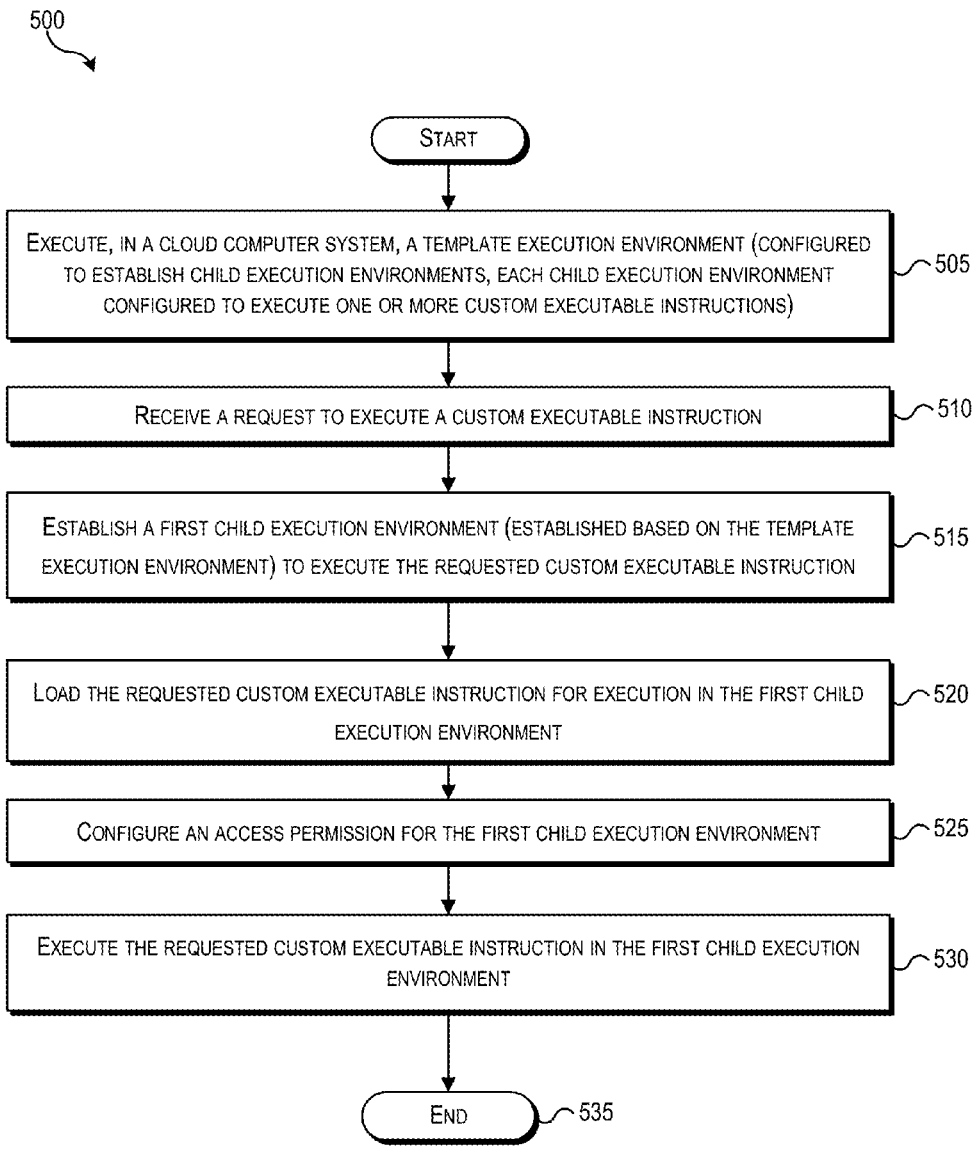
FIG. 5 is a flowchart illustrating a process for providing access to a custom execution environment for execution of custom executable instructions according to some embodiments of the present invention.

In FIG. 5, a flowchart is shown that illustrates a process 500 for providing access to a custom execution environment for execution of custom executable instructions according to some embodiments of the present invention. Specifically, process 500 enables a user to execute custom executable instructions in a custom execution environment of a cloud service. Process 500 establishes a child execution environment configured to execute custom executable instructions. The child execution environment is setup based on a template execution environment that is configured for one or more criterion. In certain embodiments, a cloud computer system (e.g., cloud computer system 110) may implement process 500.

Process 500 is illustrated as a logical flow diagram, the operation of which represents operations that may be implemented in hardware, computer instructions, or a combination thereof. In the context of computer instructions, the operations represent computer-executable instructions, stored on one or more computer-readable storage media, which when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Beginning at block 505, process 500 may include executing, in a cloud computer system, a template execution environment. The template execution environment may be configured to establish child execution environments, each of child execution environment of which may be configured to execute one or more custom executable instructions. The template execution environment may be configured before executing the template execution environment. As explained earlier with reference to FIG. 3, configuring the template execution environment may include initializing settings of the template execution environment and/or initializing a state of the template execution environment.

At block 510, process 500 may include receiving a request to execute a custom executable instruction. For example, cloud computer system 110 may receive, from computing device 102, a request to execute a custom executable instruction. In some embodiments, a request may include multiple custom executable instructions, all or some of which may correspond to one or more types of custom executable instructions. At block 515, process 500 may include establishing a child execution environment to execute the requested custom executable instruction. The child execution environment may be established in a cloud computer system. The child execution environment may be established based on the template execution environment. The child execution environment may be established to run multiple custom executable instructions if requested. In some embodiments, a template execution environment may be selected based on a type of a custom executable instruction. As such, different template execution environments may be selected to establish a child execution environment for a particular type of custom executable instruction.

At block 520, once a child execution environment is established, a requested custom executable instruction may be loaded for execution in the child execution environment. At block 525, process 500 may include configuring one or more settings for the established child execution environment. A setting may include one or more access permissions, such as a permission to adjust a state of one or more environment or execution variables for the child execution environment. The access permission may be configured to prevent custom executable instructions from unwanted manipulations of the environment beyond access to resources permitted for the environment. For example, access to systems files may be restricted during execution of custom executable instructions. By doing so, access to resources (e.g., memory or processing resources) or the ability to spawn additional threads may be controlled (e.g., restricted or permitted) to create a desired environment. Access permissions may be adjusted so as to ensure the child execution environment is sandboxed or secured adequately and/or to prevent the custom executable instructions from interfere with instructions executing in other execution environments. Finally, at block 530, process 500 may include executing the requested custom executable instruction in the child execution environment established for the instruction. Process 500 may end at block 535.

It will be appreciated that process 500 is illustrative and that variations and modifications are possible. Steps described as sequential may be executed in parallel, order of steps may be varied, and steps may be modified, combined, added or omitted. In certain embodiments, process 500 may be implemented when enterprise data is received via a wireless communication connection to a network. For example, process 500 may be performed for each request to execute one or more custom executable instructions. It should be noted that process 500 can be performed concurrently for requests that are received in multiple communications from a computing device. In certain embodiments, block 505 may be performed for each template execution environment. Block 510 may be performed immediately after block 505 is performed or may be performed at a later time. A template execution environment may be configured after block 510 is implemented and before block 515 when a child execution environment is established based on the template execution environment. In some embodiments, block 520 may be implemented before a child execution environment is established at block 515.

Figure 6:
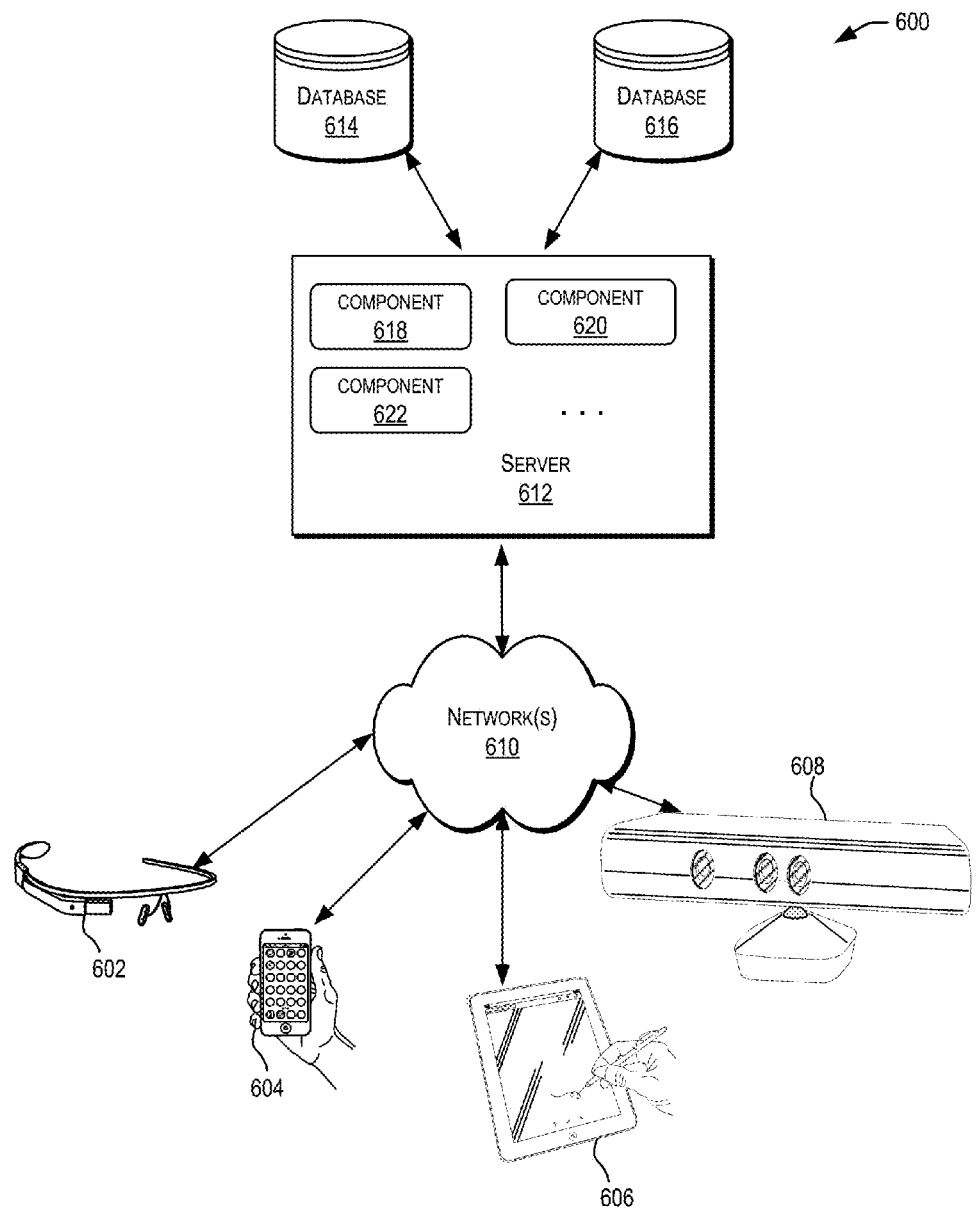
FIG. 6 depicts a simplified diagram of a distributed system for implementing one of the embodiments.

FIG. 6 depicts a simplified diagram of a distributed system 600 for implementing one of the embodiments. The distributed system 600 can implement all or some elements of computer system 100, all or some elements of computer system 200, or a combination thereof. The distributed system 600 can implement operations, methods, and/or processes (e.g., process 400 of FIG. 4 and process 500 of FIG. 4). In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. In certain embodiments, the one or more client computing devices 602-608 can include or implement cloud computer system 110 of FIG. 1 or computing device 102. Server 612 may be communicatively coupled with remote client computing devices 602, 604, 606, and 608 via network 610. The server 612 can include computing device 102 or cloud computer system 110.

In various embodiments, server 612 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing described above according to an embodiment of the present invention.

Server 612 may run an operating system including any of those discussed above, as well as any commercially available server operating system. Server 612 may also run any of a variety of additional server applications and/or mid-tier applications, including HTTP servers, FTP servers, CGI (common gateway interface) servers, Java® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands. The one or more databases 614 and 616 can include or be implemented as database 114.

Figure 7:
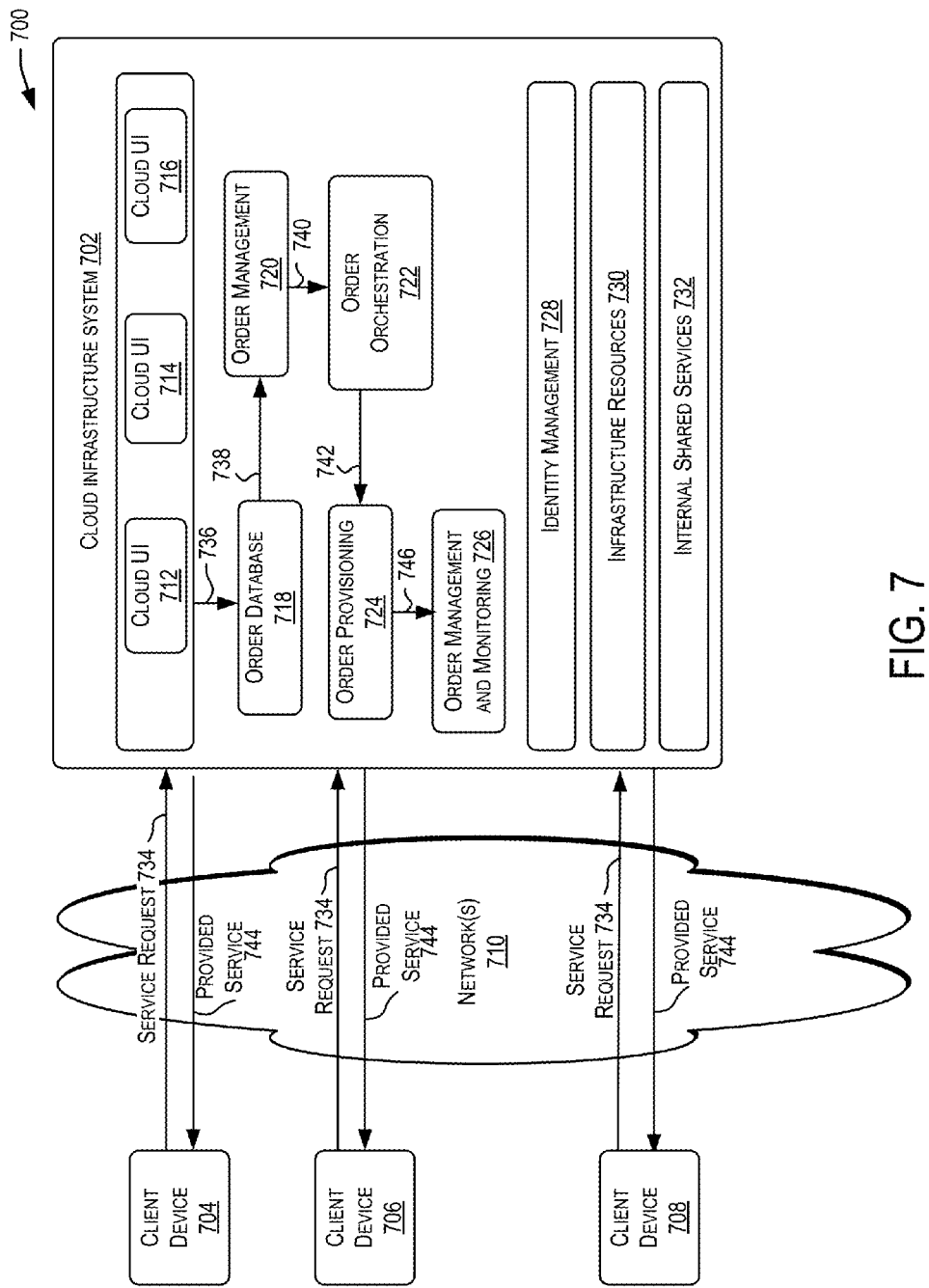
FIG. 7 shows a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present invention. The system environment 700 can include or implement all or some elements of computer system 100, all or some elements of computer system 200, or a combination thereof. The system environment 700 can implement operations, methods, and/or processes (e.g., process 400 of FIG. 4 or process 500 of FIG. 5). In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. For example, the cloud infrastructure system 702 can include or implement all or part of cloud computer system 110. In some other embodiments, cloud infrastructure system 702 may have more or fewer components than shown in the figure, may combine two or more components, or may have a different configuration or arrangement of components.

Client computing devices 704, 706, and 708 may be devices similar to those described above for client computing devices 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 710.

Cloud infrastructure system 702 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve enterprise data, structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.). Identity management module 728 may also include the management of descriptive information about each customer and about how and by whom that descriptive information can be accessed and modified.

Figure 8:
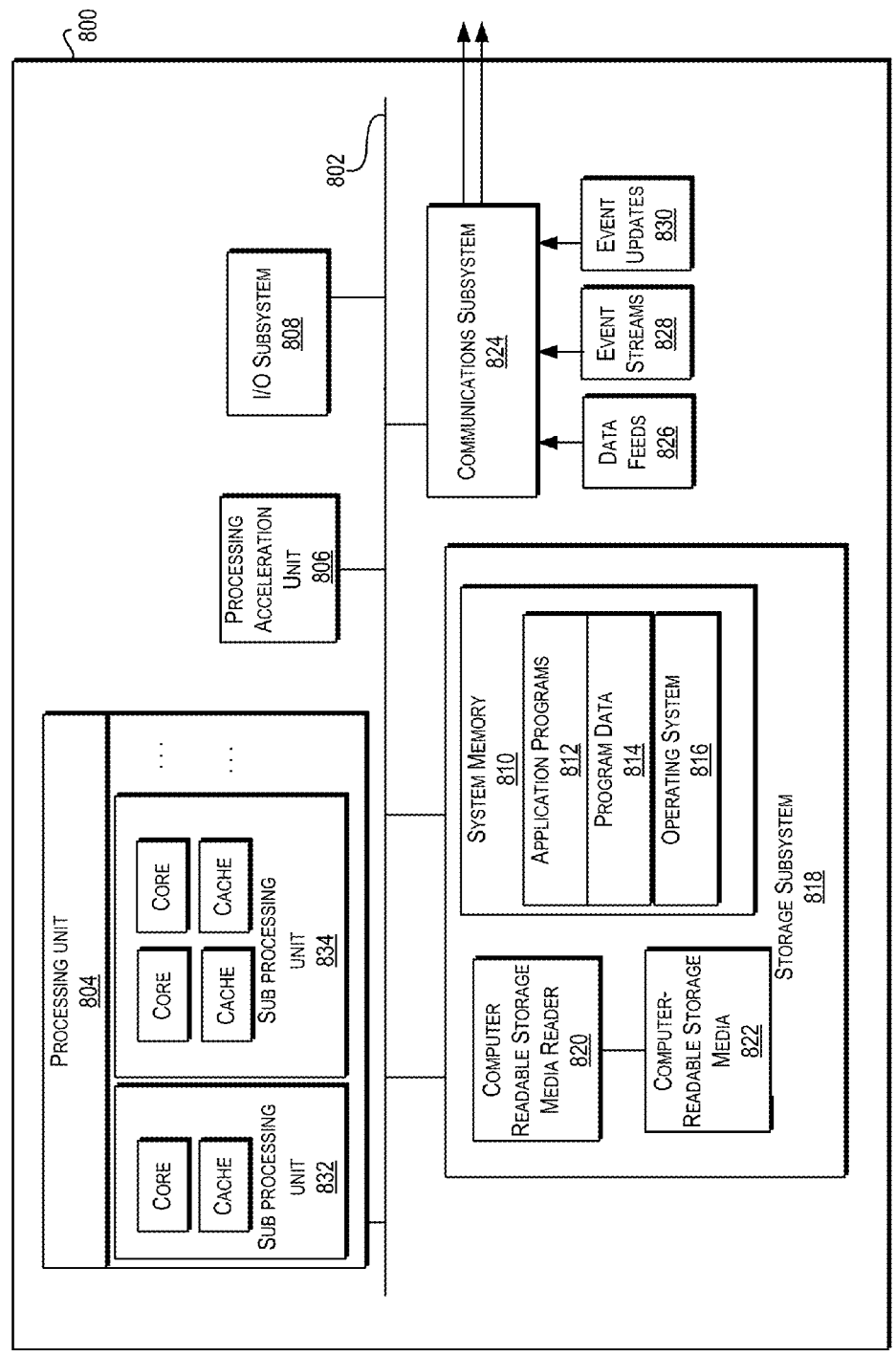
FIG. 8 illustrates an exemplary computer system, in which various embodiments of the present invention may be implemented.

FIG. 8 illustrates an exemplary computer system 800, in which various embodiments of the present invention may be implemented. The computer system 800 may be used to implement any of the computer systems described above. For example, all or some elements of computer system 800, all or some elements of computer system 200, or combinations thereof can be included or implemented in the computer system 800. The computer system 800 can implement operations, methods, and/or processes (e.g., process 400 of FIG. 4 or process 500 of FIG. 5). As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 9:
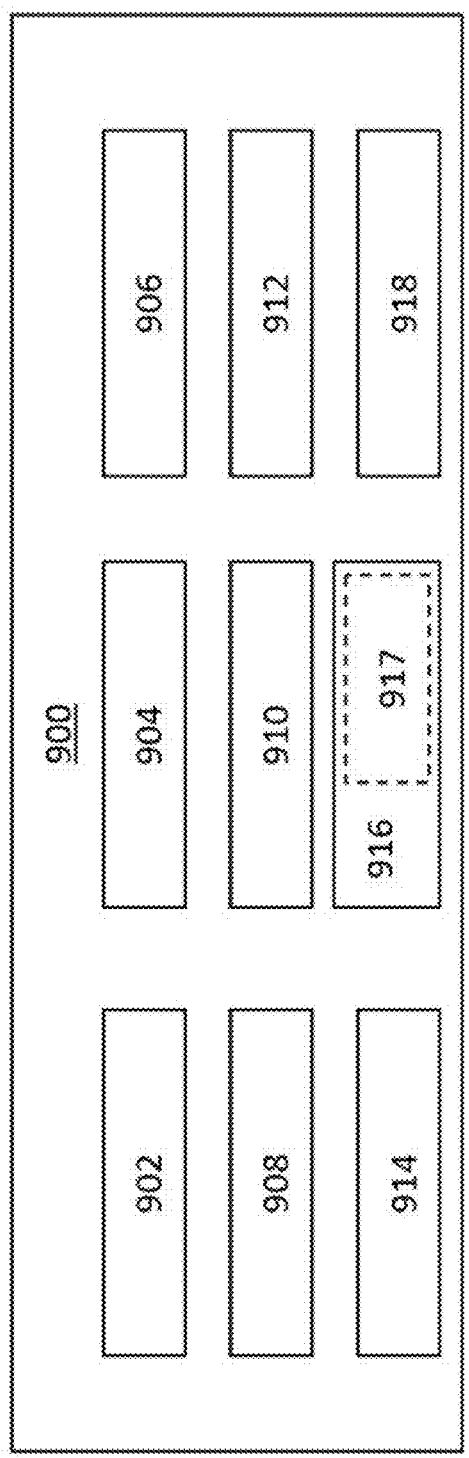
FIG. 9 illustrates a functional block diagram of an exemplary computer system, in which various embodiments of the present invention may be implemented.

In accordance with some embodiments, FIG. 9 depicts a functional block diagram of an exemplary computer system 900 configured in accordance with the principles of the present invention as described above. The functional blocks of the computer system 900 may be implemented by hardware, software, or a combination of hardware and software to carry out the principles of the present invention. It is to be understood by those skilled in the art that the functional blocks described in FIG. 9 may be combined or separated into sub-blocks to implement the principles of the present invention as described above. Therefore, the description herein may support any possible combination or separation or further definition of the functional blocks described herein.

Referring to FIG. 9, the computer system 900 may include a first receiver 902 and a second receiver 904. The first receiver 902 may receive a criterion for configuring a template execution environment of a plurality of template execution environments. Each template execution environment of the plurality of template execution environments may establish a child execution environment, and each template execution environment of the plurality of template execution environments may be configured to execute a different type of custom executable instruction. The second receiver 904 may receive, from a computing device (not shown) using a first communication protocol, a request to execute a custom executable instruction.

The computer system 900 may further include a classifying unit 906. The classifying unit 906 may classify a type of custom executable instruction corresponding to the requested custom executable instruction. Then, a selecting unit 908 of the computer system 900 may select a first template execution environment from the plurality of template execution environments based on the classified type of custom executable instruction. As shown, a first executing unit 910 may execute the first template execution environment.

The computer system may further include an establishing unit 912 that may establish a first child execution environment to execute the requested custom executable instruction. The first child execution environment may be established based on the first template execution environment. A loading unit 914 may load the requested custom executable instruction for execution in the first child execution environment. Then, a configuring unit 916 may configure an access permission for the first child execution environment, and a second executing unit 918 may execute the requested custom executable instruction in the first child execution environment. The requested custom executable instruction may be executed after the access permission is configured for the first child execution environment.

In certain embodiments, the computer system 900 may be a mobile cloud computer system, and the computing device (not shown) may be a mobile computing device.

In certain embodiments, the first child execution environment inherits a configuration of the template execution environment.

In certain embodiments, the configuring unit 916 further comprises an adjusting unit 917 configured to adjust permission for accessing the requested custom executable instruction. The permission may be adjusted to prevent the requested custom executable instruction from being accessed from within the first child execution environment.

In the foregoing specification, embodiments of the invention are described with reference to specific embodiments thereof, but those skilled in the art will recognize that the invention is not limited thereto. Various features and embodiments of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer system comprising:
one or more processors; and
one or more memory devices coupled to the one or more processors, the one or more memory devices including one or more instructions that, upon execution on the one or more processors, cause the one or more processors to:
receive a criterion for configuring a template execution environment of a plurality of template execution environments, wherein each template execution environment of the plurality of template execution environments is configured to establish a child execution environment, and wherein the template execution environment of the plurality of template execution environments is configured to execute one or more custom executable instructions in the child execution environment that is established based on the template execution environment;
receive, from a mobile device, a request to execute a custom executable instruction for a tenant registered with a cloud computer system;
determining, based on the request to execute a custom executable instruction, a custom execution service provided by the cloud computer system to execute the custom executable instruction;

classify, by the custom execution service, a type of custom executable instruction corresponding to the requested custom executable instruction;

select, by the custom execution service, a first template execution environment from the plurality of template execution environments based on a type of execution environment, wherein the type of execution environment is configured to support execution of the classified type of custom executable instruction based on one or more resources permitted for access by the tenant registered with the cloud computer system, wherein the selected first template execution environment is a Java virtual machine (JVM) environment;

execute, by the custom execution service, the first template execution environment;

establish, by the custom execution service, a first child execution environment to execute the requested custom executable instruction, wherein the first child execution environment is established based on the first template execution environment, wherein the first child execution environment is a child JVM environment;

load the requested custom executable instruction for execution in the first child execution environment; and then configure, by the custom execution service, the first child execution environment to enable execution of the requested custom executable instruction, wherein the configuring includes setting one or more settings of a callable interface to control access by the custom executable instruction to a plurality of services from the cloud computer system, wherein the configuring includes adjusting a first access permission of the first child execution environment through a security model for the selected first template execution environment, wherein the first access permission specifies one or more types of operations that are permitted or prohibited in the first child execution environment by the requested custom executable instruction executed in the first child execution environment, wherein configuring includes adjusting a second access permission of the first child execution environment for access to a resource not located in the first child execution environment, and wherein the second access permission is adjusted to prevent the resource from being accessed by the requested custom executable instruction from within the first child execution environment; and execute the requested custom executable instruction in the first child execution environment, wherein the requested custom executable instruction is executed after the first child execution environment is configured for the first child execution environment, and wherein execution of the requested custom executable instruction causes one or more operations to be performed on data for the tenant in the cloud computer system.

2. The computer system of claim 1, wherein the request to execute the custom executable instruction includes a plurality of requests, wherein the plurality of requests includes a first request and a second request, wherein the first request is to execute the custom executable instruction as a first custom executable instruction for the tenant, wherein the second request is to execute a second custom executable instruction for the tenant, and wherein the one or more instructions which, upon execution on the one or more processors, further cause the one or more processors to:

establish, a second child execution environment to execute the second custom executable instruction, wherein the second child execution environment is established based on the selected template execution environment;

load the second custom executable instruction for execution in the second child execution environment;

configure the second child execution environment to enable execution of the second custom executable instruction, wherein the configuring includes setting the one or more settings of the callable interface to control access by the second custom executable instruction to the plurality of services from the computer system; and execute the second custom executable instruction in the second child execution environment.

3. A non-transitory, processor readable memory device having stored thereon one or more instructions that, upon execution by one or more processors, cause the one or more processors to:

receive a criterion for configuring a template execution environment of a plurality of template execution environments, wherein each template execution environment of the plurality of template execution environments is configured to establish a child execution environment, and wherein the template execution environment of the plurality of template execution environments is configured to execute one or more custom executable instructions in the child execution environment that is established based on the template execution environment;

receive, from a mobile device, a request to execute a custom executable instruction for a tenant registered with a cloud computer system;

determining, based on the request to execute a custom executable instruction, a custom execution service provided by the cloud computer system to execute the custom executable instruction;

classify, by the custom execution service, a type of custom executable instruction corresponding to the requested custom executable instruction;

select, by the custom execution service, a first template execution environment from the plurality of template execution environments based on a type of execution environment, wherein the type of execution environment is configured to support execution of the classified type of custom executable instruction based on one or more resources permitted for access by the tenant registered with the cloud computer system, wherein the selected first template execution environment is a Java virtual machine (JVM) environment;

execute, by the custom execution service, the first template execution environment;

establish, by the custom execution service, a first child execution environment to execute the requested custom executable instruction, wherein the first child execution environment is established based on the first template execution environment, wherein the first child execution environment is a child JVM environment;

load the requested custom executable instruction for execution in the first child execution environment; and then configure, by the custom execution service, the first child execution environment to enable execution of the requested custom executable instruction, wherein the configuring includes setting one or more settings of a callable interface to control access by the custom executable instruction to a plurality of services from the cloud computer system, wherein the configuring includes adjusting a first access permission of the first child execution environment through a security model for the selected first template execution environment, wherein the first access permission specifies one or more types of operations that are permitted or prohibited in the first child execution environment by the requested custom executable instruction executed in the first child execution environment, wherein configuring includes adjusting a second access permission of the first child execution environment for access to a resource not located in the first child execution environment, and wherein the second access permission is adjusted to prevent the resource from being accessed by the requested custom executable instruction from within the first child execution environment; and execute the requested custom executable instruction in the first child execution environment, wherein the requested custom executable instruction is executed after the first child execution environment is configured for the first child execution environment, and wherein execution of the requested custom executable instruction causes one or more operations to be performed on data for the tenant in the cloud computer system.

4. The non-transitory, processor readable memory device of claim 3, wherein the request to execute the custom executable instruction includes a plurality of requests, wherein the plurality of requests includes a first request and a second request, wherein the first request is to execute the custom executable instruction as a first custom executable instruction for the tenant, wherein the second request is to execute a second custom executable instruction for the tenant, and wherein the one or more instructions which, upon execution on the one or more processors, further cause the one or more processors to:

establish, a second child execution environment to execute the second custom executable instruction, wherein the second child execution environment is established based on the selected template execution environment;

load the second custom executable instruction for execution in the second child execution environment;

configure the second child execution environment to enable execution of the second custom executable instruction, wherein the configuring includes setting the one or more settings of the callable interface to control access by the second custom executable instruction to the plurality of services from the computer system; and execute the second custom executable instruction in the second child execution environment.

5. A method comprising:

receiving a criterion for configuring a template execution environment of a plurality of template execution environments, wherein each template execution environment of the plurality of template execution environments is configured to establish a child execution environment, and wherein the template execution environment of the plurality of template execution environments is configured to execute one or more custom executable instructions in the child execution environment that is established based on the template execution environment;

receiving, from a mobile device, a request to execute a custom executable instruction for a tenant registered with a cloud computer system;

determining, based on the request to execute a custom executable instruction, a custom execution service provided by the cloud computer system to execute the custom executable instruction;

classifying, by the custom execution service, a type of custom executable instruction corresponding to the requested custom executable instruction;

selecting, by the custom execution service, a first template execution environment from the plurality of template execution environments based on a type of execution environment, wherein the type of execution environment is configured to support execution of the classified type of custom executable instruction based on one or more resources permitted for access by the tenant registered with the cloud computer system, wherein the selected first template execution environment is a Java virtual machine (JVM) environment;

executing, by the custom execution service, the first template execution environment;

establishing, by the custom execution service, a first child execution environment to execute the requested custom executable instruction, wherein the first child execution environment is established based on the first template execution environment, wherein the first child execution environment is a child JVM environment;

loading the requested custom executable instruction for execution in the first child execution environment; and then configuring, by the custom execution service, the first child execution environment to enable execution of the requested custom executable instruction, wherein the configuring includes setting one or more settings of a callable interface to control access by the custom executable instruction to a plurality of services from the cloud computer system, wherein the configuring includes adjusting a first access permission of the first child execution environment through a security model for the selected first template execution environment, wherein the first access permission specifies one or more types of operations that are permitted or prohibited in the first child execution environment by the requested custom executable instruction executed in the first child execution environment, wherein configuring includes adjusting a second access permission of the first child execution environment for access to a resource not located in the first child execution environment, and wherein the second access permission is adjusted to prevent the resource from being accessed by the requested custom executable instruction from within the first child execution environment; and executing the requested custom executable instruction in the first child execution environment, wherein the requested custom executable instruction is executed after the first child execution environment is configured for the first child execution environment, and wherein execution of the requested custom executable instruction causes one or more operations to be performed on data for the tenant in the cloud computer system.

6. The method of claim 5, wherein the request to execute the custom executable instruction includes a plurality of requests, wherein the plurality of requests includes a first request and a second request, wherein the first request is to execute the custom executable instruction as a first custom executable instruction for the tenant, and wherein the second request is to execute a second custom executable instruction for the tenant, the method further comprising:

establishing, a second child execution environment to execute the second custom executable instruction, wherein the second child execution environment is established based on the selected template execution environment;
loading the second custom executable instruction for execution in the second child execution environment;
configuring the second child execution environment to enable execution of the second custom executable instruction, wherein the configuring includes setting the one or more settings of the callable interface to control access by the second custom executable instruction to the plurality of services from the computer system; and
executing the second custom executable instruction in the second child execution environment.

* * * * *